_(12)_ United States Patent
Topors et al.

(10) Patent No.: US 12,544,402 B2
(45) Date of Patent: Feb. 10, 2026

(54) TARGETED EXPRESSION OF MICROBIAL CHOLESTEROL CATALYSIS GENES REDUCES EXCESS LIPID

(71) Applicant: Repair Biotechnologies, Inc., Syracuse, NY (US)

(72) Inventors: Mourad Topors, Scarborough (CA); Reason, Syracuse, NY (US); Guilherme Cherman Perdigão de Oliveira, Rio de Janeiro (BR); Marc Ridilla, Camillus, NY (US); Jayanta Mukherjee, Braintree, MA (US); David Mackenzie-Liu, Syracuse, NY (US); Garrett Strough, Lorraine, NY (US); David Thomas, Charlottesville, VA (US)

(73) Assignee: Repair Biotechnologies, Inc., Syracuse, NY (US)

( * ) Notice: Subject to any disclaimer, the term of this patent is extended or adjusted under 35 U.S.C. 154(b) by 724 days.

(21) Appl. No.: 17/187,509

(22) Filed: Feb. 26, 2021

(65) Prior Publication Data

US 2021/0268019 A1 Sep. 2, 2021

Related U.S. Application Data

(60) Provisional application No. 63/094,075, filed on Oct. 20, 2020, provisional application No. 62/983,102, filed on Feb. 28, 2020.

(51) Int. Cl.
*A61K 35/12* (2015.01)
*C12N 9/04* (2006.01)
*C12N 15/52* (2006.01)
*C12N 15/86* (2006.01)

(52) U.S. Cl.
CPC ............ *A61K 35/12* (2013.01); *C12N 9/0006* (2013.01); *C12N 15/52* (2013.01); *C12N 15/86* (2013.01); *C12Y 101/01145* (2013.01); *C12Y 114/15006* (2013.01); *C12Y 118/01006* (2015.07); *C12Y 503/03001* (2013.01); *C12N 2750/14143* (2013.01); *C12Y 101/03006* (2013.01)

(58) Field of Classification Search
CPC ...... A61K 35/12; C12N 9/0006; C12N 15/52; C12N 15/86; C12N 2750/14143; C12N 9/001; C12Y 101/01145; C12Y 101/03006; C12Y 103/99004; C12Y 114/13142; C12Y 118/01002
See application file for complete search history.

(56) References Cited

U.S. PATENT DOCUMENTS

| | | | |
|---|---|---|---|
| 5,484,727 A | 1/1996 | Chang et al. | |
| 5,547,868 A | 8/1996 | Miller et al. | |
| 5,939,318 A | 8/1999 | Miller et al. | |
| 6,903,183 B1 | 6/2005 | Stocco et al. | |
| 8,741,812 B2 | 6/2014 | Javitt | |
| 11,612,619 B2 | 3/2023 | Honkanen et al. | |
| 2004/0121992 A1 | 6/2004 | Javitt | |
| 2006/0110730 A1 | 5/2006 | Bose et al. | |
| 2006/0172423 A1 | 8/2006 | Van et al. | |
| 2006/0252705 A1 | 11/2006 | Shaw et al. | |
| 2012/0039929 A1 | 2/2012 | Ginns et al. | |
| 2015/0258081 A1 | 9/2015 | Lukas et al. | |
| 2016/0152955 A1 | 6/2016 | Sakamoto et al. | |
| 2016/0264615 A1 | 9/2016 | Ren et al. | |
| 2019/0160088 A1 | 5/2019 | Anto et al. | |
| 2020/0179452 A1* | 6/2020 | Honkanen | C12N 9/0036 |
| 2023/0263829 A1 | 8/2023 | Honkanen et al. | |
| 2024/0050592 A1 | 2/2024 | Topors et al. | |
| 2024/0075108 A1 | 3/2024 | Topors et al. | |

FOREIGN PATENT DOCUMENTS

| | | | |
|---|---|---|---|
| CN | 102168098 B | 3/2013 | |
| JP | 5643643 B2 | 12/2014 | |
| WO | 03104811 A2 | 12/2003 | |
| WO | 2010103837 A1 | 9/2010 | |
| WO | WO-2018020323 A2 * | 2/2018 | ........... C12N 15/102 |
| WO | 2023212622 A1 | 11/2023 | |

OTHER PUBLICATIONS

Van der Geize et al., Targeted disruption of the kstD gene encoding a 3-ketosteroid Δ1-dehydrogenase isoenzyme of Rhodococcus erythropolis strain SQ1. Applied and environmental microbiology, 66(5), 2029-2036. (Year: 2000).*
Corkery-Hayward, M., & Metherell, L. A. . Adrenal dysfunction in mitochondrial diseases. International Journal of Molecular Sciences, 24(2), 1126. (Year: 2023) pp. 1-19.*
Liu, W., Qin, L., Yu, H., Lv, F. and Wang, Y., ApoA-I/ABCA1 expression reduces lipids. J Gastroenterol Hepatol, 29: 614-622. (Year: 2014).*
Liu, Wei, et al. "Apolipoprotein A-I and adenosine triphosphate-binding cassette transporter A 1 expression alleviates lipid accumulation in hepatocytes." Journal of gastroenterology and hepatology 29.3 (2014): 614-622. (Year: 2014).*

(Continued)

*Primary Examiner* — Maria G Leavitt
*Assistant Examiner* — Michael Angelo Riga
(74) *Attorney, Agent, or Firm* — Foley Hoag LLP; Matthew D. Jonsen

(57) ABSTRACT

Disclosed herein are compositions, constructs, cassettes, vectors, cells, nucleic acids, peptides, proteins, protocols and methods for reducing cholesterol and lipid buildup in mammalian subjects, via gene and/or cell therapeutic treatments. In many embodiments, the disclosed compositions, cells, constructs, cassettes, vectors, nucleic acids, peptides, proteins, protocols and methods may help to reduce lipid levels in mammals. In one embodiment, the disclosed compositions, cells, constructs, cassettes, vectors, nucleic acids, peptides, proteins, protocols and methods are useful in reducing lipid build-up, especially cholesterol, in liver cells.

16 Claims, 5 Drawing Sheets

Specification includes a Sequence Listing.

(56) References Cited

OTHER PUBLICATIONS

Grossman, Mariann, et al. "Successful ex vivo gene therapy directed to liver in a patient with familial hypercholesterolaemia." Nature genetics 6.4 (1994): 335-341. (Year: 1994).*
International Search Report and Written Opinion dated Aug. 12, 2021 in connection with International Patent Application No. PCT/US2021/020053, 18 pages.
Invitation to Pay Additional Search Fees dated Jun. 22, 2021 in connection with PCT/US2021/020053, 11 pages.
D'Arcy et al. "Development of a Synthetic 3-ketosteroid Delta(1)-dehydrogenase for the Generation of a Novel Catabolic Pathway Enabling Cholesterol Degradation in Human Cells," Scientific Reports, vol. 9, Apr. 12, 2019, 9 pages., Apr. 12, 2019.
Toannou, George N. "The Role of Cholesterol in the Pathogenesis of NASH," Trends in Endocrinology & Metabolism, Oct. 2016, 1096, 12 pages.
Tirosh, Oren, "Hypoxic signaling and cholesterol lipotoxicity in fatty liver disease progression," Oxidative Medicine and Cellular Longevity, vol. 2018, Article ID 2548154, May 31, 2018, 15 pages.
Office Action dated Feb. 12, 2024 in connection with Canadian patent application No. 3,163,100, 5 pages.
Anderson, R.G. (2003). Joe Goldstein and Mike Brown: from cholesterol homeostasis to new paradigms in membrane biology. Trends in Cell Biology, 13(10), 534-539.
Austin, M.A., Hutter, C.M., Zimmern, R.L., and Humphries, S.E. (2004). Genetic causes of monogenic heterozygous familial hypercholesterolemia: a HUGE prevalence review. American Journal of Epidemiology, 160(5), 407-420.
Brzostek, et al. ChoD and HsdD can be dispensable for cholesterol degradation in mycobacteria. Journal of Steroid Biochemistry and Molecular Biology, 134, 1-7.
Cooper, R.A. (1977). Abnormalities of cell-membrane fluidity in the pathogenesis of disease. New England Journal of Medicine, 297(7), 371-377.
Fellin, R., Arca, M., Zuliani, G., Calandra, S., and Bertolini, S. (2015). The history of Autosomal Recessive Hypercholesterolemia (ARH). From clinical observations to gene identification. Gene, 555(1), 23-32.
Franklin, B.A., Durstine, J.L., Roberts, C.K., and Barnard, R.J. (2014). Impact of diet and exercise on lipid management in the modern era. Best Practice & Research Clinical Endocrinology & Metabolism, 28(3), 405-421.
Huang, M.C., and Miller, W.L. (2001). Creation and activity of COS-1 cells stably expressing the F2 fusion of the human cholesterol side-chain cleavage enzyme system. Endocrinology, 142(6), 2569-2576.
Kellner-Weibel, G., Geng, Y.J., and Rothblat, G.H. (1999). Cytotoxic cholesterol is generated by the hydrolysis of cytoplasmic cholesteryl ester and transported to the plasma membrane. Atherosclerosis, 146(2), 309-319.
Liu, H.H., and Li, J.J. (2015). Aging and dyslipidemia: a review of potential mechanisms. Ageing Research Reviews, 19, 43-52.
Newman, J.W., Morisseau, C., and Hammock, B.D. (2005). Epoxide hydrolases: their roles and interactions with lipid metabolism. Progress in Lipid Research, 44(1), 1-51.
Russell, D.G. (2001). Mycobacterium tuberculosis: here today, and here tomorrow. Nature Reviews Molecular Cell Biology, 2(8), 569-577.
Russell, D.W. (1992). Cholesterol biosynthesis and metabolism. Cardiovascular Drugs and Therapy, 6(2), 103-110.
Russell, D.W. (2003). The enzymes, regulation, and genetics of bile acid synthesis. Annual Review of Biochemistry, 72, 137-174.
Schiffer, L., Anderko, S., Hannemann, F., Eiden-Plach, A., and Bernhardt, R. (2015). The CYP11B subfamily. Journal of Steroid Biochemistry and Molecular Biology, 151, 38-51.
Song, Jiayi et al. "Association of Plasma 7-Ketocholesterol With Cardiovascular Outcomes and Total Mortality in Patients With Coronary Artery Disease," Circulation Research, 2017, 10 pages.
Stewart, G.R., Robertson, B.D., and Young, D.B. (2003). Tuberculosis: a problem with persistence. Nature Reviews Microbiology, 1(2), 97-105.
Weverling-Rijnsburger, et al. (2003). High-density vs low-density lipoprotein cholesterol as the risk factor for coronary artery disease and stroke in old age. Archives of Internal Medicine, 163(13), 1549-1554.
Baggetto, Loris G. "Role of Mitochondria in Carcinogenesis," Eur J Cancer, vol. 29A, No. 1, pp. 156-159, 1993.
Singh et al. "Pathogenesis of atherosclerosis: a multifactorial process." Experimental and Clinical Cardiology, 2002, 7(1), 40-53.
Galluzzi L. et al. "Mitochondria as therapeutic targets for cancer chemotherapy," Oncogene, 2006, 25, 4812-4830.
Chiang et al. "Cholest-4-en-3-one -. 1-dehydrogenase, a flavoprotein catalyzing the second step in anoxic cholesterol metabolism." Applied and Environmental Microbiology, Jan. 2008, 74(1), 107-113.
Takimoto, Chris H. et al. "Safety and anti-tumor activity of sorafenib (Nexavar) in combination with other anti-cancer agents: a review of clinical trials," Cancer Chemother Pharmacol, 2008, 61, 535-548.
Kim, Won et al. "Synergistic anti-tumor efficacy of lovastatin and protein kinase C-beta inhibitor in hepatocellular carcinoma," Cancer Chemother Pharmacol, 2009, 64, 497-507.
Gao J. et al. "Combined Inhibitory Effects of Celecoxib and Fluvastatin on the Growth of Human Hepatocellular Carcinoma Xenografts in Nude Mice," The Journal of International Medical Research, 2010, 38, 1413-1427.
Zhang, Shali et al. "Fluvastatin Enhances Sorafenib Cytotoxicity in Melanoma Cells via Modulation of AKT and JNK Signaling Pathways," Anticancer Research, 31, 3259-3266, 2011.
Go et al. "Heart Disease and Stroke Statistics -- 2014 Update; A Report from the American Heart Association," AHA Statistical Update, 2014, Circulation, 129 (3) e28-e292.
Lee, Sun Jae et al. "Synergistic effect of simvastatin plus NS398 on inhibition of proliferation and survival in hepatocellular carcinoma cell line," Journal of Gastroenterology and Hepatology, 29, 1299-1307, 2014.
Lui et al. "Usefulness of lipid apheresis in the treatment of familial hypercholesterolemia." Journal of Lipids, 2014, 864317.
Yeh et al. "Deletion of the gene encoding the reductase component of 3-ketosteroid 9a- hydroxylase in Rhodococcus equi USA-18 disrupts sterol catabolismleading to the accumulation of 3-oxo .... " Microbial Cell Factories, 2014, 13, 130.
Huang, Xin et al. "Simvastatin induces growth inhibition and apoptosis in HepG2 and Huh7 hepatocellular carcinoma cells via upregulation of Notch1 expression," Molecular Medicine Reports, 11, 2334-2340, 2015.
Hatooka, Masahiro et al. "Comparison of Outcome of Hepatic Arterial Infusion Chemotherapy and Sorafenib in Patients with Hepatocellular Carcinoma Refractory to Transcatheter Arterial Chemoembolization," Anticancer Research, 36, 3523-3530, 2016.
Feng, Jiao et al. "Simvastatin re-sensitizes hepatocellular carcinoma cells to sorafenib by inhibiting HIF-1a/PPAR-y/PKM2-mediated glycolysis," Journal of Experimental & Clinical Cancer Research, 39:24, 2020.
Shao et al. "Liver X Receptor Agonism Sensitizes a Subset of Hepatocellular Carcinoma to Sorafenib by Dual-Inhibiting MET and EGFR," Neopolasia, vol. 22, No. 1, Jan. 1, 2020, pp. 1-9.
Sinensky. "Defective regulation of cholesterol biosynthesis and plasma membrane fluidity in a Chinese hamster ovary cell mutant." Proceedings of the National Academy of Sciences of the United States of America, Jan. 5, 1987, 75(3), 1247-1249.
Febbraio, Mark A. et al. "Preclinical Models for Studying NASH-Driven HCC: How Useful Are They?" Cell Metabolism 29, Jan. 8, 2019.
Feo, F et al. "Effect of Cholesterol Content on Some Physical and Functional Properties of Mitochondria Isolated from Adult Rat Liver, Fetal Liver, Cholesterol-Enriched Liver and Hepatomas AH-130, 3924A and 5123," Biochimica et Biophysica Acta, 1975.
Caballero, Francisco, et al. "Enhanced free cholesterol, SREBP-2 and StAR expression in human NASH," Journal of Hepatology 50, Jan. 14, 2009, 789-796.

(56) References Cited

OTHER PUBLICATIONS

Lee, Jae-Seon et al. "Loss of SLC25A11 causes suppression of NSCLC and melanoma tumor formation," EBioMedicine 40, Jan. 25, 2019, 184-197.
Sayin, Volkan I. et al. "Antioxidants Accelerate Lung Cancer Progression in Mice," Science Translational Medicine, vol. 6, Issue 221, Jan. 29, 2014.
Van der Geize et al. "A gene cluster encoding cholesterol catabolismin a soil actinomycete provides insight into Mycobacterium tuberculosis survival in macrophages." PNAS, Feb. 6, 2007, 104(6), 1947-1952.
Montero, Joan et al. "Cholesterol and peroxidized cardiolipin in mitochondrial membrane properties permeabilization and cell death," Biochimica et Biophysica Acta 1797, Feb. 11, 2010, 1217-1224.
Robinson. "Management of familial hypercholesterolemia: a review of the recommendations from the National Lipid Association Expert Panel on Familial Hypercholesterolemia." Journal of Managed Care and Specialty Pharmacy, Mar. 2013, 19(2), 139-149.
Wilkinson et al. "Harnessing RNA Interference for Cholesterol Lowering: The Bench to Bedside Story of Inclisiran." Journal of the America Heart Association, Mar. 8, 2024, 15 pages.
Pandey et al. "Mycobacterial persistence requires the utilization of host cholesterol." PNAS, Mar. 18, 2008, vol. 105, No. 11, pp. 4376-4380.
Lin et al. "Role of Steroidogenic Acute Regulatory Protein in Adrenal and Gonadal Steroidogenesis," Science, vol. 267, Mar. 24, 1995.
Russell "Fifty years of advances in bile acid synthesis and metabolism." Journal of Lipid Research, Apr. 2009, 50(Suppl), S120-S125.
Bosch, Marta et al. "Caveolin-1 Deficiency Causes Cholesterol-Dependent Mitochondrial Dysfunction and Apoptotic Susceptibility," Current Biology 21, 681-686, Apr. 26, 2011.
Solsona-Vilarrasa, Estel et al. "Cholesterol enrichment in liver mitochondria impairs oxidative phosphorylation and disrupts the assembly of respiratory supercomplexes," Redox Biology 24, May 9, 2019.
Ferrari et al. "A coat protein on phagosomes involved in the intracellular survival of mycobacteria." Cell Press, May 14, 1999, 97(4), 435-447.
Petrusma et al. "3-Ketosteroid 9a-hydroxylase enzymes: Rieske non-heme monooxygenases essential for bacterial steroid degradation." Antonie van Leeuwenhoek Journal of Microbiology, May 21, 2014, 106(1), 157-172.
Sugawara et al. "Human steroidogenic acute regulatory protein: functional activity in COS-1 cells, tissue-specific expression, and mapping of the structural gene to 8p11.2 and a pseudogene to chromosome 13," PNAS, vol. 92, No. 11, May 23, 1995.
Coll, Olga et al. "Sensitivity of the 2-Oxoglutarate Carrier to Alcohol Intake Contributes to Mitochondrial Glutathione Depletion," Hepatology, vol. 38, No. 3, May 27, 2003.
Chen, Jiang, et al. "Potential molecular, cellular and microenvironmental mechanism of sorafenib resistance in hepatocellular carcinoma," Cancer Letters, Jun. 25, 2015.
Kim et al. "Correlation between serum lipid parameters and Interleukin-10 concentration in obese individuals." Journal of Obesity and Metabolic Syndrome. Jun. 30, 2021. 5 pages.
Crain, Richard C. et al. "Role of Lipid Transfer Proteins in the Abnormal Lipid Content of Morris Hepatoma Mitochondria and Microsomes," Cancer Research 43, 3197-3202, Jul. 1983.
Montero, Joan et al. "Mitochondrial Cholesterol Contributes to Chemotherapy Resistance in Hepatocellular Carcinoma," Cancer Research, 68, 13, Jul. 1, 2008.
Ribas, Vicent et al. "Glutathione and mitochondria," Frontiers in Pharmacology, vol. 5, Article 151, Jul. 1, 2014.
Penfield et al. "Substrate specificities and conformational flexibility of 3-ketosteroid 9a- hydroxylases." Journal of Biological Chemistry, Jul. 21, 2014, 289(37), 25523-25536.
Martens et al. "Hypercholesterolemia impairs immunity to tuberculosis." Infection and Immunity, Aug. 2008, 76(8), 3464-3472.
Petrusma et al. "Rhodococcus rhodochrous DSM 43269 3-ketosteroid 9alpha-hydroxylase, a two-component iron-sulfur-containing monooxygenase with subtle steroid substrate specificity." Applied and Environmental Microbiology, Aug. 2009, 75(16), 5300-5307.
Petrusma et al. "Multiplicity of 3-ketosteroid-9a-hydroxylase enzymes in Rhodococcus rhodochrous DSM43269 for specific degradation of different classes of steroids." Journal of Bacteriology, Aug. 2011,193(15).
Zhou et al. "Inactivation of Hypoxia-Induced YAP by Statins Overcomes Hypoxic Resistance Tosorafenib in Hepatocellular Carcinoma Cells," Scientific Reports, vol. 6, No. 1, Aug. 1, 2016.
Nordestgaard et al. "Familial hypercholesterolaemia is underdiagnosed and undertreated in the general population: guidance for clinicans to prevent coronary heart disease." EP Heart Journal, Aug. 15, 2013, 34, 3478-3490.
Baulies, Anna et al. "The 2-Oxoglutarate Carrier Promotes Liver Cancer by Sustaining Mitochondrial GSH Despite Cholesterol Loading," Redox Biology, Aug. 24, 2017.
Brown et al. "A proteolytic pathway that controls the cholesterol content of membranes, cells, and blood." Proc. Natl. Acad. Sci. USA. Vol. 96, p. 11041-11048, Sep. 1999.
Colell, Anna et al. "Cholesterol Impairs the Adenine Nucelotide Translocator-mediated Mitochondrial Permeability Transition through Altered Membrane Fluidity," The Journal of Biological Chemistry, vol. 278, No. 36, Sep. 5, 2003.
Klink et al. Cholesterol oxidase is indispensable in the pathogenesis of Mycobacterium tuberculosis. PLOS ONE, Sep. 9, 2013, 8(9), e73333.
Smith, Bradley et al. "Anticancer Activity of the Cholesterol Exporter ABCA1 Gene," Cell Reports 2, 580-590, Sep. 27, 2012.
Le Gal, Kristell, et al. "Antioxidants can increase melanoma metastasis in mice," Science Translational Medicine, Oct. 7, 2015, vol. 7, Issue 308.
Capyk et al. "Activity of 3-ketosteroid 9a-hydroxylase (KshAB) indicates cholesterol side chain and ring degradation occur simultaneously in Mycobacterium tuberculosis." Journal of Biological Chemistry, Oct. 10, 2011, 286(47), 40717-40724.
Kim et al. "Emodin Sensitizes Hepatocellular Carcinoma Cells to the Anti-Cancer Effect of Sorafenib through Suppression of Cholesterol Metabolism," International Journal of Molecular Sciences, vol. 19, No. 10, Oct. 12, 2018.
Ouellet et al. "Cholesterol catabolismas a therapeutic target in Mycobacterium tuberculosis." Trends in Microbiology, Nov. 2011, 19(11), 530-539.
Kasiewicz et al. Lipid nanoparticles incorporating a GalNAc ligand enable in vivo liver ANGPTL3 editing in wild-type and somatic LDLR knockout non-human primates. Nov. 8, 2021, 7 pages.
Abdou-Alfa, Ghassan K. et al. "Doxorubicin Plus Sorafenib vs Doxorubicin Alone in Patients with Advanced Hepatocellular Carcinoma," JAMA, Nov. 17, 2010, vol. 304, No. 19.
Enayetallah et al. ["Opposite regulation of cholesterol levels by the phosphatase and hydrolase domains of soluble epoxide hydrolase." Journal of Biological Chemistry, Dec. 26, 2008, 283(52), 36592-36598.
Arif, Kamil, Enabling Cholesterol Catabolismin Human Cells; Partial Thesis, University of South Alabama, May 2012, 32 Pages.
Bednarska, Mediators of Inflammation; 2014: 498395, Jul. 8, 2014.
Chica et al. "Semi-rational approaches to engineering enzyme activity: combining the benefits of directed evolution and rational design," Current Opinion in Biotechnology, 2005, 16, 378-384.
Chistiakov, Journal of Cellular Molecular Medicine; 20(1): 17-28, Aug. 19, 2015.
D'Arcy, Scientific Reports; 9:5969 www.nature.com/scientificreports, Apr. 12, 2019.
Giovanna, Protein Expression and Purification 79: 231-236, May 20, 2011.
Harikrishna, DNA and Cell Biology; vol. 12, No. 5: 371-379, 1993.
Singh et al. "Protein Engineering Approaches in the Post-Genomic Era," Current Protein and Peptide Science, 2017, 18, 1-11.
Taylor, Cardiovascular Research; 86: 526-534, Jan. 18, 2010.
Zhang, Wu et al. "Fluvastatin, a lipophilic statin, induces apoptosis in human hepatocellular carcinoma cells through mitochondria-operated pathway," Indian Journal of Experimental Biology, vol. 48, Dec. 2010, pp. 1167-1174.

(56) References Cited

OTHER PUBLICATIONS

D'Arcy et al. "Development of a Synthetic 3-ketosteroid Delta(1)-dehydrogenase for the Generation of a Novel Catabolic Pathway Enabling Cholesterol Degradation in Human Cells," Scientific Reports, vol. 9, Apr. 12, 2019, 17 pages.

\* cited by examiner

TARGETED EXPRESSION OF MICROBIAL CHOLESTEROL CATALYSIS GENES REDUCES EXCESS LIPID

CROSS-REFERENCE TO RELATED APPLICATIONS

This application claims benefit of priority pursuant to 35 U.S.C. § 119 (e) of U.S. provisional patent application No. 62/983,102 entitled "Targeted Expression Of Microbial Cholesterol Catalysis Genes Reduces Excess Lipid In Liver," filed on 28 Feb. 2020, and U.S. provisional patent application No. 63/094,075 entitled "Targeted Expression Of Microbial Cholesterol Catalysis Genes Reduces Excess Lipid In Liver," filed on 20 Oct. 2020, each of which is hereby incorporated by reference in its entirety.

FIELD

The disclosed processes, methods, and systems are directed to treatment of cholesterol-related diseases by introduction of microbial-derived catalytic genes and enzymes via cell therapy and/or gene therapy.

SEQUENCE LISTING

The instant application contains a Sequence Listing which has been submitted electronically in ASCII format and is hereby incorporated by reference in its entirety. Said ASCII copy, created on Feb. 25, 2021, is named P286540_WO_01-507078_00010_SL.txt and is 82,265 bytes in size.

BACKGROUND

High levels of cholesterol inside cells are characteristic of a number of conditions, from atherosclerosis to fatty liver disease. Treatments for this excess lipid and/or cholesterol build-up are generally directed to altering native lipoprotein metabolism because human cells lack the ability to catabolize cholesterol.

Cholesterol derivatives, may, in some cases, be toxic. For example, build-up of 7-ketocholesterol (7KC), a pro-inflammatory, pro-oxidant, pro-apoptotic, and fibrogenic oxsterol is linked to various cardiovascular, eye, and neurological diseases.

What is needed are compositions and methods for reducing lipid and cholesterol levels in the subjects suffering from excess lipid and cholesterol.

DETAILED DESCRIPTION

Figure 1:
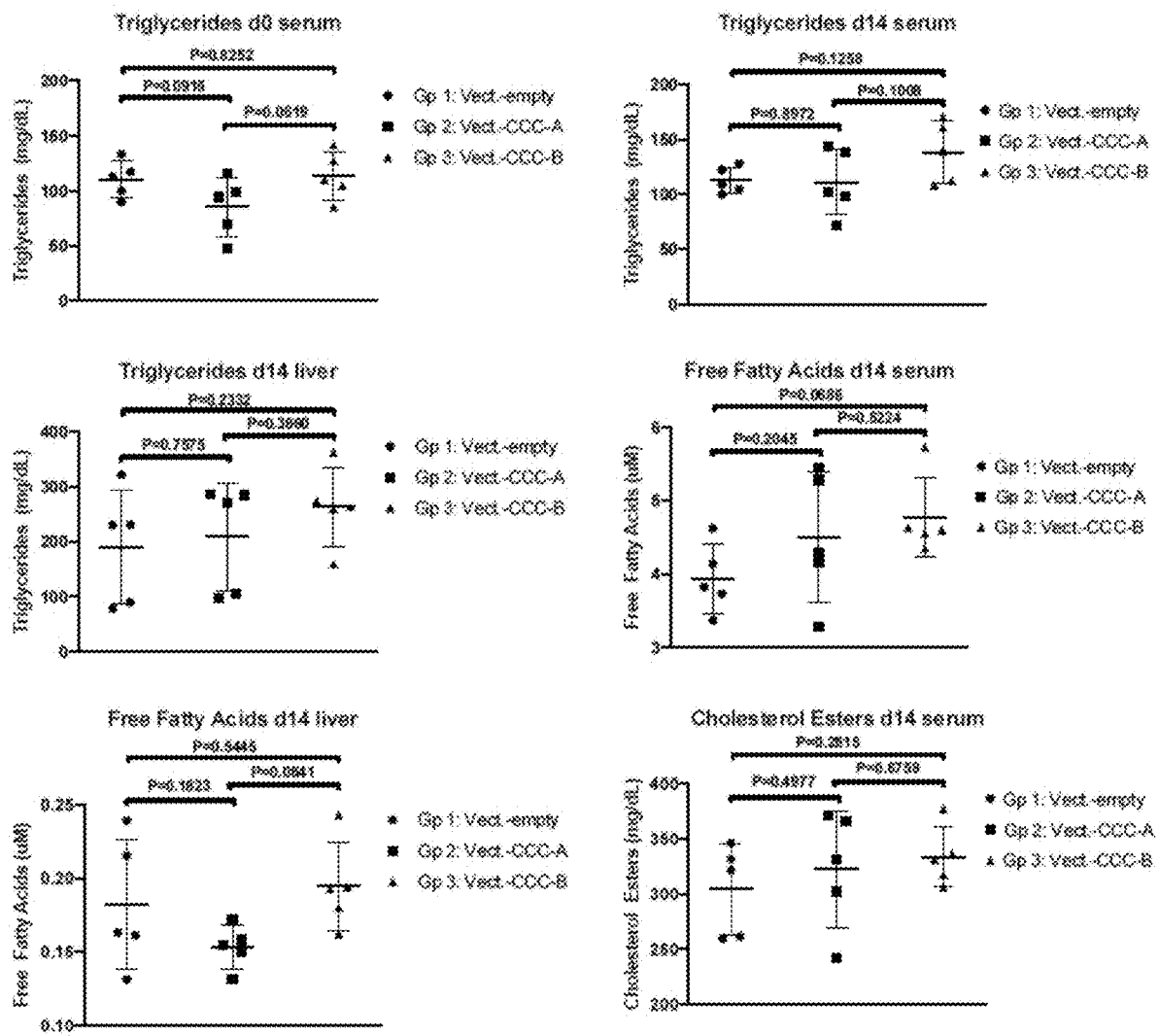
FIG. 1 scatter plots for mice of Groups 1-3 showing serum triglycerides at day 0 and day 14 (d14); liver triglycerides at d14, Fatty acids in serum and liver at d14; serum cholesterol esters at d14. Bars at tops of plot indicated p-value relationship between groups.

High serum cholesterol levels are associated with atherosclerosis and coronary disease. In atherosclerosis, fatty plaques are deposited within the walls of blood vessels, especially in the heart. Atherosclerosis is an underlying cause of cardiovascular disease (CVD), myocardial infarction, stroke and peripheral vascular disease, all of which are leading causes of death in the United States. Inherited defects in many different aspects of lipoprotein metabolism as well as, poor diet, a sedentary lifestyle, and various secondary effects of other disorders (notably diabetes, hypothyroidism and kidney disease) can contribute to onset and progression of atherosclerosis.

High cholesterol may also lead to build-up of fat in various tissues, including the liver. Overweight or obese patients, or patients with high triglyceride levels, diabetes, and/or high cholesterol and may have excess fat in their livers. Accumulation of liver fat at more than about 5-10% of total liver weight may indicate more serious underlying pathology and/or the development of non-alcoholic fatty liver disease (NAFLD). NAFLD, which can also affect lean/non-obese individuals, is known to result from disorders that affect cholesterol signaling and pathways. NAFLD refers to a collection of liver disease ranging from simple fatty liver (steatosis), to nonalcoholic steatohepatitis (NASH), to cirrhosis (irreversible, advanced scarring of the liver). These diseases are related in that fat is accumulated in the cells of the (hepatocytes), while NASH includes inflammation (hepatitis) and/or scarring (fibrosis) of the liver. NASH can ultimately destroy the hepatocytes leading to liver necrosis. Free hepatic cholesterol is a major lipotoxic molecule that may be critical in the development of NASH.

Most present treatments for excess cholesterol and/or lipid levels are directed to altering the native lipoprotein metabolic pathways and/or signaling, while few treatments effectively target lipids and cholesterol that has already accumulated.

Applicants disclose herein compositions, methods, and systems for delivering cholesterol-catabolizing transgenes to mammalian cells or tissues to reduce and or prevent build-up of excess cholesterol. In some embodiments, the disclosed compositions and methods may be useful in reducing cholesterol and lipoprotein buildup in various tissues, including arterial walls.

Disclosed herein are methods including the administration of one or more proteins involved in cholesterol metabolism to a mammalian subject. In some embodiments, one or proteins may be bacterially-derived enzymes involved in cholesterol catabolismor degradation. In many embodiments, administration of the one or more of the disclosed proteins and/or enzymes may provide for degradation of various lipids and/or cholesterol in one or more of the subject's cells.

Cholesterol Degrading Enzymes

Disclosed herein are various cholesterol, and cholesterol-related genes and proteins. In various embodiments, the disclosed genes and proteins may be enzymes or transport proteins. In some embodiments, the disclosed genes and proteins may aid in catabolizing/degrading cholesterol, or shuttling/transporting cholesterol across a membrane or lipid bilayer. As used herein, the term cholesterol refers to cholesterin or cholesteryl alcohol, a sterol of formula $C_{27}H_{46}O$, with IUPAC names cholest-5-en-3β-ol, and (3S, 8S,9S,10R,13R,14S,17R)-10,13-dimethyl-17-[(2R)-6-methylheptan-2-yl]-2,3,4,7,8,9,11,12,14,15,16,17-dodecahydro-1H-cyclopenta[a]phenanthren-3-ol. As used herein, the term cholesterol may also refer to derivatives of cholesterol, including oxidized cholesterol, $C_{27}H_{46}O_2$, Oxycholesterol, or 5,6-epoxycholesterol, 7-ketocholesterol (7KC), cholestane-3β,5α,6β-triol and 7-α/β hydroxycholesterol, etc. As used herein, cholesterol related and cholesterol catabolizing or degrading proteins may refer to proteins that interact, bind, or act on cholesterol, cholesterol derivatives, compounds in a cholesterol metabolic pathway.

The disclosed cholesterol related genes and proteins may be selected from cholesterol dehydrogenase (CholD), 3-ketosteroid Δ1-dehydrogenase (Δ1-KstD), anoxic cholesterol metabolism B enzyme (acmB), 3-ketosteroid 9α-hydroxylase (KshAB), 3β-hydroxysteroid dehydrogenase 2 (HSD2), P450-ferredoxin reductase-ferredoxin fusion protein (P450-FdxR-Fdx), ATP-binding cassette subfamily A, member 1 (ABCA1 at ncbi.nlm.nih.gov/), ATP-binding cassette, subfamily G, member 2 variants (ABCG2 at ncbi.nlm.nih.gov), and combinations thereof. In some embodiments, the disclosed proteins comprise an amino acid sequence with greater than about 80% identity to any one or more of SEQ ID NOS: 2, 4, 5, 6, 7, 8, 9, 10, 11, and 12 or proteins coded for by SEQ ID NOS: 1 and 13. In many embodiments, the presently claimed identity may be over a sequence greater than about 100, 150, 200, 250, 300, 350, or 400 amino acids and less than about 500, 450, 400, 350, 300, 250, 200, or 150 amino acids. In many embodiments, the sequence identity may be greater than about 80%, 85%, 90%, 91%, 92%, 93%, 94%, 95%, 96%, 97%, 98%, or 99%, and less than about 100%, 99%, 98%, 97%, 96%, 95%, 94%, 93%, 92%, 91%, 90%, or 85%.

In many embodiments, the disclosed cholesterol related genes and proteins may be involved in transporting cholesterol across a cell membrane. In various embodiments, the ABCA1 (SEQ ID NO: 11) and ABCG2 (SEQ ID NO: 12) genes and proteins may be useful in reducing cholesterol in a subject. ABCA1 may also be referred to known as CERP or cholesterol efflux regulatory protein. The ABCG2 protein is located in mammalian cells' plasma membrane and aids in transporting various compounds from the cell. In the case of ABCA1, cholesterol is transported to apoA1 and apoE. ABCG2 may be found in the canalicular membrane of hepatocytes and may aid in excreting compounds into bile. ABCG2 is known to require high membrane cholesterol content for maximal activity, and by examining purified ABCG2 reconstituted in proteoliposomes we have recently shown that cholesterol is an essential activator, while bile acids significantly modify the activity of this protein.

One or more of the disclosed cholesterol related genes, proteins, and enzymes may be packaged into one or more vector, construct or cassette. In various embodiment, a cassette that includes one or more cholesterol related proteins or cholesterol degrading enzymes may be referred to as a cholesterol catabolizing cassette (CCC). In some embodiments the cassette may be a polynucleotide construct and may include a nucleic acid sequence that codes for a protein with identity to a protein coded for by any one of SEQ ID NOS: 1 or 13. In some embodiments the cassette may be a construct having a protein sequence that is between about 80% or more identical to the protein sequence of one or more of SEQ ID NOS: 2, 4, 5, 6, 7, 8, 9, 10, 11, or 12. In some embodiments, the cassette may be ribonucleic acid that codes for one or more proteins of SEQ ID NO:2, 4, 5, 6, 7, 8, 9, 10, 11, or 12.

Disclosed herein are compositions, vectors, methods, and protocols useful in reducing cholesterol levels in at least one cell of a mammalian subject in need thereof. In many embodiments, the subject is a human suffering from, or at risk of developing, one or more conditions associated with high cholesterol levels.

Vectors, Cassettes, and Constructs

Various vehicles may be used to deliver the vector, cassette, or construct to target cells. In some embodiments, the vector may be chemical, viral, and/or non-viral. In some embodiments, the vector may be selected from a virus, nanoparticle, liposome, cell-penetrating peptides, etc. Where the vector is a viral vector, the virus may be mammalian, non-mammalian, or synthetic. In some embodiments, the vector may be adenoviruses, retroviruses, etc. Where the vector is a nanoparticle or liposome, the construct may be RNA or DNA, for example mRNA. In many embodiments, a lipo-nanoparticle (LNP) may be used to deliver a polynucleotide, for example mRNA or other therapeutic nucleic acids, coding for one or more cholesterol related proteins or cholesterol catabolizing enzymes. In many cases, use of LNP may allow for delivery of multiple RNAs and/or DNAs that are larger than may be delivered by other methods. In some embodiments, the disclosed LNP and/or LNP systems may include one or more of four components whose variations can optimize their integrity and organ-specificity, particularly to the liver. In some embodiments, the LNP variations may include one or more of ionizable cationic lipids, phospholipids (typically phosphatidylcholine), cholesterol, and PEG-lipids. Additionally, some LNP formulations may include one or more fusion-associated small transmembrane proteins that may help increase cell/tissue specific delivery of the LNP and may help ensure fusion, especially highly efficient fusion, and intracellular delivery of the therapeutic nucleic acid payloads directly into the cytoplasm, bypassing the endocytic pathway.

The disclosed vectors, cassettes, and constructs may be targeted to specific cell or tissue types, and/or expression of genes coded for by the vectors, cassettes, and constructs may be restricted and/or optimized for specific cells and cell-types. In some embodiments, particles, for example lipid nanoparticles comprising the disclosed vectors, cassettes, and constructs, may comprise a membrane comprising one or more transmembrane proteins with affinity for a receptor or outer membrane protein on a target cell or cell of a target tissue. In many embodiments, promoter sequences, which may include contiguous or non-contiguous sequences and/or 5' untranslated regions, may be used to express the disclosed genes, wherein the promoters have limited or no activity in non-target cells or tissues. In some embodiments, the disclosed promoters may resist silencing, which may result in lowering of expression over time. In some embodiments, for example, the target cells may be liver cells for example cells found in liver tissue. In these embodiments, the vectors, cassettes, and constructs may be targeted to liver cells via a particle comprising a membrane protein with affinity for a liver-cell receptor or liver-cell membrane protein and/or may include one or more promoters that are liver-specific, with little or no activity in other cell and tissue types. Some examples of the disclosed promoters may have greater than 80% identity to CMV, Ef1a, ABCA1 (available at ncbi.nlm.nih.gov/), or a promoter in SEQ ID NOs: 1 and 13, for example to a contiguous or non-contiguous section(s) of from about 100 bp to 2 kbp, for example 200 bp to 1.5 k, in some embodiments greater than 100 bp, 200 bp, 300 bp, 400 bp, 500 bp, 600 bp, 700 bp, 800 bp, 900 bp, 1.0 kb, 1.2 kbp, 1.3 kbp, 1.4 kbp, 1.5 kbp, 1.6 kbp, 1.7 kbp, 1.8 kbp, or 1.9 kbp, and less than about 2.5 kbp, 2.4 kbp, 2.3 kbp, 2.2 kbp, 2.1 kbp, 2.0 kbp, 1.9 kbp, 1.8 kbp, 1.7 kbp, 1.6 kbp, 1.5 kbp, 1.4 kbp, 1.3 kbp, 1.2 kbp, 1.1 kbp, 1.0 kbp, 900 bp, 800 bp, 700 bp, 600 bp, 500 bp, 400 bp, or 300 bp.

Gene Therapy

The cholesterol related proteins, as one example cholesterol degrading enzymes, may be targeted to mammalian cells, for example in a subject in need thereof. In some embodiments, the proteins are targeted to the cell in one or more vectors. In some embodiments, the vectors may comprise one or more enzymes, proteins, peptides, nucleic acids, or combinations thereof. In one embodiment, for example wherein the vector comprises nucleic acids, the vector may further include one or more mammalian expression control sequences comprising a nucleic acid sequence that regulates expression of the one or more cholesterol related proteins or cholesterol degrading enzymes, which may include one or more bacterial cholesterol catabolizing enzymes. In some embodiments, the vector may be targeted, directly or indirectly to a variety of cells and tissues. In some embodiments, the vectors may be delivered to liver tissue, liver cells, blood vessels, arterial endothelial cells, muscle cells, epithelial cells, macrophages, hepatocytes, hepatic stellate cells, Kupffer cells, liver sinusoidal endothelial cells or any other cell that may contain or be associated with excess cholesterol, or may aid in reducing cholesterol levels in a subject. In some embodiments, the disclosed vector may be preferentially taken-up by liver cells, endothelial cells, and/or macrophages.

The disclosed vectors, constructs, enzymes, and methods may be useful in reducing the concentration of at least one lipid in the cells of a subject treated with the vector, construct, enzyme, or method. In many embodiments, the at least one lipid is cholesterol. In many embodiments, the concentration of the lipid may be reduced in one or more mammalian cells before a reduction of lipid in serum is detected. In some embodiments, the cell may be a hepatocyte, or other mammalian cell.

Cell Therapy

The cholesterol degrading enzymes may be targeted to mammalian cells in the subject. In some embodiments, the cells are modified in vitro to include the one or more cholesterol related genes or proteins, and then administered to the subject. In these embodiments, delivery of cholesterol degrading genes, proteins and enzymes may include a cell therapeutic approach. In one embodiment, one or more cells may be isolated from a subject in need of treatment. In other embodiments, the one or more cells may be obtained from a donor that may be related or unrelated to the subject. In most embodiments, the cells may be stem cells or may be induced pluripotent stem cells. Cells may be obtained from various sources, for example tissue, blood, bone marrow, cord blood, etc., that has been obtained from the subject or donor. The cells may be modified to express one or more cholesterol related genes, proteins, and/or enzymes. The modified cells may then be administered to the subject.

Pluripotent stem cells (PSCs) may be modified to express one or more cholesterol related genes or proteins, such one or more cholesterol degrading enzymes. In some embodiments, the pluripotent stem cells may be induced pluripotent stem cells (iPSCs). The iPSCs may be derived from the subject (autologous), or a related or unrelated donor (heterologous or allogenic). In some embodiments, the iPSCs may be modified to reduce immunogenicity—that is, reduce rejection or attack by the subject's immune system. In some embodiments, the cells may be modified to prevent or repress expression of one or more genes, proteins, or receptors associated with immunogenicity, for example major histocompatability (MHC) genes, for example MHC class I and MHC class II. In some embodiments these genes may be deleted in the iPSCs prior to administration to the subject. For some cell types, a lack of MHC class I expression may lead to identification and attack (for example lysis) by Natural Killer (NK) cells. To overcome this "missing self" response, a gene may be introduced into the cells prior to administration—this may be referred to as knock-in of the gene. In some embodiments, a single heavy chain of a non-polymorphic HLA gene (e.g. HLA E) may be knocked-in.

In some embodiments, it may be useful to remove the administered cells after the subject has been treated. In these embodiments, the disclosed cells may be modified prior to administration to the subject to include one or more genes that may aid in removing, eliminating, destroying, or killing the administered cell, for example after administration to a subject. In some embodiments, the gene is a gene that, when expressed, renders the cells susceptible to one or more compounds and/or kills the cell. In some embodiments, this may be referred to as a "suicide gene." In many embodiments, the gene is associated with cytochrome P450 2 B1, human intestinal carboxylesterase, and cytosine deaminase which are capable of converting cyclophosphamide, irinotecan and fluorocytosine into active metabolites, respectively. In some embodiments, the gene is thymidine kinase (TK), for example TK from Herpes Simplex Virus (HSV-TK). In most embodiments, expression of the suicide gene may result in the modified cells being vulnerable to compound or molecule that does not have an effect (or has minimal effect) on cells that do not harbor the suicide gene. In many embodiments, for example where the suicide gene is HSV-TK, the compound may be a prodrug, for example ganciclovir (GCV). In these embodiments, the HSV-TK modified cells may be killed with low doses of GCV, while cells without the HSV-TK gene are not.

Cells expressing one or more cholesterol related genes or proteins, such as cholesterol degrading enzymes may undergo differentiation. In many embodiments, the cells may be treated to promote differentiation toward a selected cell type. In these embodiments, the cells may be transformed, transfected, stimulated, and/or subjected to one or more factors, hormones, peptides, proteins, compounds, molecules to aid in differentiation. In many embodiments, the disclosed PSCs may be treated to differentiate into immune cells, for example monocytes, macrophages and dendritic cells. In other embodiments, the cells may be differentiated to a type similar to the targeted tissue or cell in the subject.

Briefly, human iPSCs may be differentiated into monocytes as follows. Human iPSCs may be seeded and cultured using methods well known in the art. The cells may be culture in bone morphogenetic protein 4 (BMP4), activin A, and CHIR99021 (GSK-3 inhibitor) for about 2 days to induce the cells to form mesoderm. Cells are next cultured for 3 days in vascular endothelial growth factor (VEGF), basic fibroblast growth factor (FGF2), SB431542 (TGF-βR inhibitor), and stem cell factor (SCF), to allow for differentiation into hemogenic endothelium (HE). HE cells are CD144$^+$/CD34$^+$/CD73$^-$ and they can be further differentiated to CD43$^+$ HPCs. In many cases, differentiation efficiency can be determined by FACS analysis scoring for mesoderm (CD140a+) and HEs (CD144+CD34+CD73−) at day 2 and day 5, respectively. Hematopoietic cells are induced from day 5 to day 9 by growth in VEGF, FGF2, SCF, interleukin 3 (IL-3), interleukin 6 (IL-6), and thrombopoietin (TPO). Here again, differentiation efficiency can be estimated based on the number of rounded HPCs in the population, or efficiency may be quantified by FACS analysis, scoring for the HPC-specific marker CD43 (for example at day 9). On day 9, the round HPCs are collected first before dissociation of adherent cells using TrypLE and Accutase sequentially to minimize cell stress. Finally, monocyte cells are induced from HPCs by growth in suspension culture in media containing IL-3, IL-6, and macrophage colony-stimulating factor (M-CSF). Monocyte induction from HPCs in 5 to 6 days.

After administration to a subject, the modified monocyte and/or macrophage cells, comprising one or more genes selected from cholesterol degrading enzymes, suicide genes, etc. may migrate to sites of inflammation, for example blood vessels having atherosclerotic lesions and/or liver tissue with fatty liver cells. In many embodiments, the modified monocytes and/or macrophages may enter the site of inflammation, for example an inflamed atheromatous blood vessel, and proceed to engulf and/or degrade cholesterol. This may aid in reducing the atherosclerotic plaque size, overall atherosclerotic burden, cholesterol concentration and/or local inflammation.

The disclosed compositions, cells, methods, and therapies are useful in treating atherosclerosis and hypercholesterolemia. In many embodiments, the disclosed therapeutic approaches and compositions may be useful in treating or preventing type I through type VI atherosclerotic lesions, for example pre-existing Type VI or complicated lesions having thrombi, fissures and signs of hematoma. In many cases the disclosed compositions, cells, methods, and therapies are useful in treating and preventing the pathogenesis/formation of such lesions, including complex lesions.

Cholesterol-Related Diseases and Disorders

Various diseases and conditions may be treated or prevented with the presently disclosed compositions and methods. In most embodiments, the disease or conditions treated with the disclosed methods and compositions are cholesterol related diseases and conditions. Some exemplary diseases and conditions that may be treated by the disclosed compositions and methods are disclosed below.

Excess native LDL and increased LDL:HDL ratio have been shown to play critical roles in cardiovascular disease, atherosclerosis, stroke and coronary heart disease and heart attacks. Acetylated LDL is an in vitro chemically modified form of LDL and does not exist in vivo. Both acetylated LDL and oxidized LDL, are taken up by macrophages, transforming those cells into foam cells. In most cases, all components of LDL are susceptible to oxidation, producing an oxidized form of LDL (oxLDL). The uptake of oxLDL by arterial macrophages is pivotal in the formation of plaques. Unlike unmodified LDL, oxLDL is taken up by arterial wall macrophages in an unregulated manner via LDL scavenger receptors. Oxysterols are 10-100× more reactive than native cholesterol, with the most toxic of these being 7-ketocholesterol (7KC), which is also the most abundant in oxLDL.

Studies find that higher levels of circulating 7KC are associated with greater future risk of cardiovascular events and increased total mortality. 7KC is a pro-inflammatory, pro-oxidant, pro-apoptotic, and fibrogenic molecule that alters endothelial cell function by disrupting cell membranes and critical ion transport pathways for vasodilatory response.

In hypercholesterolemic patients, 7 KC may account for about 57% of the plasma oxysterols. 7KC is followed by 7-α/β hydroxycholesterol (at 21% of plasma oxysterols), which is a direct product of 7KC metabolism. In arterial plaques, 55% of oxysterols are reported to be 7KC, with the second and third most abundant being cholestane-3β,5α,6β-triol and 7-α/β hydroxycholesterol at 13% and 12%, respectively.

As noted above, NASH (nonalcoholic steatohepatitis) is another disease associated with excess cholesterol, that may be treated with the disclosed compositions and methods. Altered cholesterol homeostasis and transport contribute to the accumulation of free cholesterol in the liver, which in turn contributes to NAFLD (Non-alcoholic fatty liver disease) via damage to hepatocytes and the activation of non-parenchymal cells. Particularly, the overload of free cholesterol in and around the mitochondria induces mitochondrial dysfunction and promotes inflammation, fibrosis and hepatocyte death.

Other cholesterol-associated diseases and conditions that may be treated or prevented with the disclosed compositions and methods include pulmonary alveolar proteinosis (PAP), eye disease, neurodegenerative diseases, Niemann Pick Type C (NPC), and Lysosomal Acid Lipase (LAL) deficiency. Because cholesterol content plays a role in regulating surfactant fluidity and function in lunged animals, and that fluidity can change rapidly, especially under extremes of temperature, reduced cholesterol clearance is a primary defect driving PAP pathogenesis. In the case of eye disease, oxysterols and, in particular 7KC, cause degeneration of retinal cells. Thus, increased oxysterol levels may play a role in various eye diseases including macular degeneration (AMD), choroidal neovascularization (CNV), glaucoma, and cataracts.

Increased oxysterol levels may also result in alterations in brain cholesterol metabolism. Cholesterol metabolism may be an integral part of several brain disorders including Alzheimer's disease, Amyotrophic Lateral Sclerosis (ALS), Parkinson's disease, and dementia progression. Various oxysterols derived from the auto-oxidation of cholesterol, including 7KC have been identified in post-mortem brains of patients with Alzheimer's disease. Chronic epilepsy may also share many of these pathologies. Specifically, a link has been suggested between epilepsy and atherosclerosis. Thus, treatment of atherosclerosis, such as the presently disclosed compositions, cells, and methods may lessen the effects of epilepsy. Further, 7KC is highly cytotoxic to neuronal cells and has been suspected to be involved in the progression of various neurological diseases. Surprisingly, oxysterols, unlike cholesterol, can cross the blood brain barrier (BBB) and accumulate in brain tissue, ultimately causing neurodegeneration.

Various other diseases may be linked with increased cholesterol levels, and may be treated with the disclosed compositions and methods. For example, patients with Niemann Pick Type C (NPC) are unable to clear cholesterol, causing the accumulation of cholesterol and oxysterols in mostly the liver, spleen, and brain. A positive correlation between the 7KC profile and the severity of the disease has been reported. In addition, patients with Lysosomal Acid Lipase (LAL) deficiency accumulate cholesterol esters and triglycerides in lysosomes, and can present with hypercholesterolemia, hyperlipidemia, and/or atherosclerosis. These patients also have very high levels of oxysterols, including 7KC, in their plasma. Increased formation of oxysterols further increases oxidative stress worsens the condition.

The disclosed compositions and methods are useful in treating diseases or conditions associated with excess cholesterol and/or fat deposits in cells, tissues, and organs. In some embodiments, the disease or condition may be associated with excess cholesterol and/or the presence of one or more oxidized cholesterol species, such as 7-ketocholesterol. In some embodiments, the disease or condition may be one or more of fatty liver disease, atherosclerosis, heart failure, stroke, ischemia, coronary heart disease, eye disease, neurodegenerative and neurological disease, diseases of the eye, such as macular degeneration, pulmonary dysfunction, etc.

The disclosed compositions, cells, methods, and therapies may aid in treating, reducing, or reversing various diseases, disorders, or conditions related to excess cholesterol. In one embodiment, the disease, disorder, or condition may be one or more of early type II lesions (i.e. macrophage foam cell formation), type III lesions or pre-atheromas (i.e. having small pools of extracellular lipids), type IV lesions or atheromas (i.e. having a core of extracellular lipids), type V lesions or fibroatheromas (i.e. atheromas with fibrous thickening).

Treatment

The disclosed cell therapies may help to reduce atheromas or atheromatous plaques. In some embodiments, the disclosed therapy may reduce atheromas by from about 5% to about 100%, for example from about 70% to about 90%, and by greater than about 30%, 40%, 50%, 60%, or more. For example the disclosed treatment may reduce atheroma volume in a population of patients in need of treatment for same, wherein the volume is based on imaging by one or more of invasive intravascular ultrasound (IVUS). Newer noninvasive imaging modalities like B-mode ultrasound, cardiac computed tomography (CT), positron emission tomography (PET), and magnetic resonance imaging (MRI). In many embodiments, the volume of atheroma in the population may be reduced by greater than about 10%, 15%, 20%, 25%, 30%, 35%, 40%, 45%, 50%, 55%, 60%, 65%, 70%, 75%, 80%, 85%, 90%, 95%, 96%, 97%, 98%, or 99%, and less than about 100%, 99%, 98%, 97%, 96%, 95%, 90%, 85%, 80%, 75%, 70%, 65%, 60%, 55%, 50%, 45%, 40%, 35%, 30%, 25%, 20%, 15%, or 10%, compared with a population of subject that has not been treated with the disclosed compositions, cells, methods, or therapies. In many embodiments, the interval of reduction is greater than about 1 month after treatment to about 24 months after treatment, for example more than about 2 wks, 3 wks, 4 wks, 5 wks, 6 wks, 7 wks, 8 wks, 2 mos., 3 mos., 4 mos., 5 mos., 6 mos., 7 mos., 8 mos., 9 mos., 10 mos., 11 mos., 12 mos., 13 mos., 14 mos., 15 mos., 16 mos., 17 mos., 18 mos., 19 mos., 20 mos., 21 mos., 22 mos., 23 mos., 24 mos., and less than about 36 mos., 30 mos., 25 mos., 24 mos., 23 mos., 22 mos., 21 mos., 20 mos., 19 mos., 18 mos., 17 mos., 16 mos., 15 mos., 14 mos., 13 mos., 12 mos., 11 mos., 10 mos., 9 mos., 8 mos., 7 mos., 6 mos., 5 mos., 4 mos., 3 mos., 2 mos., or 1 mos. In some embodiments, for example wherein the subjects are measured on the basis of normalized plaque fraction, a population of treated subjects (for example 2 or more subjects) may have an average reduction of more than about 30%, 40%, 45%, 50%, 55%, 60%, 65%, 70%, 75%, 80%, 85%, 90%, 95%, 96%, 97%, 98%, or 99%, and less than about 100%, 99%, 98%, 97%, 96%, 95%, 90%, 85%, 80%, 75%, 70%, 65%, 60%, 55%, 50%, 45%, 40%, 35%, 30%, 25%, 20%, 15%, or 10%, for example about 42%.

The disclosed vectors, constructs, enzymes, and methods may be useful in reducing the amount of at least one cholesterol in a cell. In most embodiments, the disclosed vectors, constructs, enzymes, and methods may reduce cellular levels of cholesterol before affecting systemic cholesterol levels, such as the level of cholesterol in a subject's serum. In one embodiment, reduction of cholesterol in at least one cell of the subject may lead to reduction in systemic cholesterol levels. In many embodiments, the level of total or free cholesterol in a tissue may be reduced more than about 10%, 20%, 30%, 40%, 50%, 60%, 70%, 80%, or 90%, and less than about 95%, 90%, 80%, 70%, 60%, 50%, 40%, 30%, 20%, or 10%. In many embodiments, the disclosed vectors, constructs, enzymes, and methods may be useful in treating or preventing atherosclerosis, cardiovascular disease (CVD), myocardial infarction, stroke, peripheral vascular disease, diabetes, hypothyroidism, kidney disease, liver disease, fatty liver, non-alcoholic fatty liver disease, NAFLD, obesity, nonalcoholic steatohepatitis (NASH), cirrhosis of the liver, hepatitis, and liver fibrosis. In many embodiments, the disclosed vectors, constructs, enzymes, and methods may be useful in treating or preventing cirrhosis, steatohepatitis, inflammation, or fibrosis of the liver.

EXAMPLES

Example 1—Mammalian Administration

Three groups of five mice (C57BL/6J; Jackson Lab #000664) were injected with empty vector (Group 1), mammalian expression vector comprising sequences for bacterial-derived cholesterol catabolizing enzymes (Group 2 and Group 3). Injections were via tail vein, with each mouse receiving about 1012 copies of the vector, cassette, or construct.

Mice were fed high fat diet (Envigo TD 88137) after injection. Both food and water were ad libitum, and each mouse was weighed daily, and data recorded.

Mice were sacrificed at 14 days. Serum and liver tissue was collected for analysis.

Example 2—Serum and Liver Lipid Concentrations

As noted above, serum samples were collected prior to sacrifice, and liver samples after sacrifice. Triglycerides in day zero (d0) and day 14 (d14) serum, and d14 liver homogenates, were quantified using the Cayman Chemical (Ann Arbor, MI) Triglyceride Colorimetric Assay Kit (Item No. 10010303). Briefly, serum is treated with a mixture of lipoprotein lipase, glycerol kinase, glycerol phosphate oxidase, peroxidase, 4-aminoantipyrine (4-AAP), and N-Ethyl-N-(3-sulfopropyl)-m-anisidine (ESPA). Glycerol is thereby released from triglycerides, phorphorylated, and oxidized, releasing hydrogen peroxide which reacts with the 4-AAP and ESPA to produce a purple color that is measured by absorbance at 530-550 nm.

Triglyceride levels in serum and liver samples were quantitated and results presented, in graphs at FIG. 1. These graphs indicate that triglyceride levels in serum were similar for all three groups at d0 and at d14. Liver tissue triglyceride levels were also similar to the three groups.

Free fatty acids levels in serum and liver were tested at d14 by colorimetric/fluorometric assay, as described by manufacturer (Abcam; ab65341 Free Fatty Acid Quantification Assay Kit). Briefly, fatty acids were converted to CoA derivatives, oxidized to generate color or fluorescence, and quantitated colorimetrically (spectrophotometry at $\lambda=570$ nm) or fluorometrically (at Ex/Em=535/587 nm). Serum samples were tested directly. Fatty acids in tissue samples were extracted and dried according to manufacturer protocol—briefly, the samples were first washed in cold PBS, then homogenized in the presence of Triton X-100 and chloroform. The samples were centrifuged to separate the organic phase, which was collected and dried prior to processing.

Levels of free fatty acids in serum and liver at day 14 were quantitated. Results are shown in FIG. 1. These results indicated there was little change in fatty acid levels in serum or liver among the three groups.

Cholesterol esters, total cholesterol, and free cholesterol levels were assayed via colorimetric/fluorometric assay according to manufacturer protocol (Abcam; ab65359, Cholesterol/Cholesteryl Ester Quantitation Assay kit). Briefly, total cholesterol was assayed by treating samples with cholesterol esterase to convert cholesterol esters to cholesterol. The cholesterol was then treated with cholesterol oxidase to yield peroxide, which is quantitated by color (($\lambda$max=570 nm) and fluorescence (Ex/Em=535/587 nm) assays. Cholesterol ester levels are determined by subtracting the amount of free cholesterol assayed prior to treatment with cholesterol esterase. Serum samples were tested directly according to manufacturer protocol. Tissue samples were first homogenized in a mixture of chloroform, isopropanol, and NP-40, centrifuged, and the organic phase collected and dried prior to analysis.

Levels of cholesterol esters in the serum of mice at day 14 were quantitated. Results are shown in FIG. 1. These results indicated there was little difference in serum levels of cholesterol esters among the three groups.

Example 3—Free and Total Cholesterol Analysis

The levels of total cholesterol and free cholesterol were compared in serum and liver tissue was analyzed or free cholesterol. Samples were assayed as described above.

Figure 2:
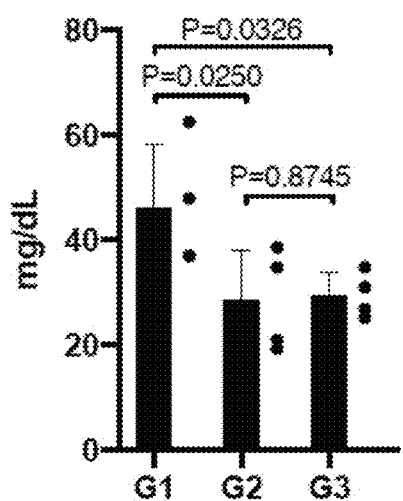
FIG. 2 bar graphs for mice of Groups 1-3 showing free cholesterol at day 14 in liver and serum; and total cholesterol at d14 in serum.
Figure 2:
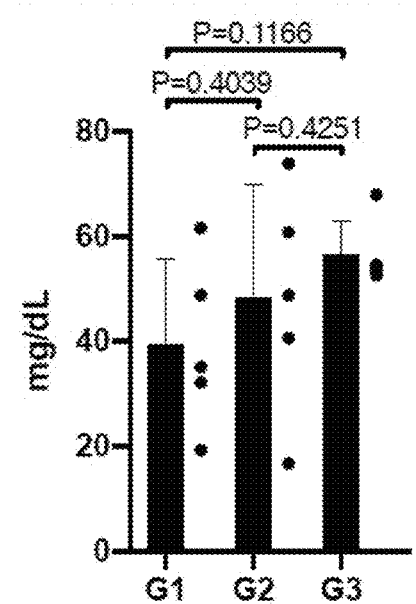
Figure 2:
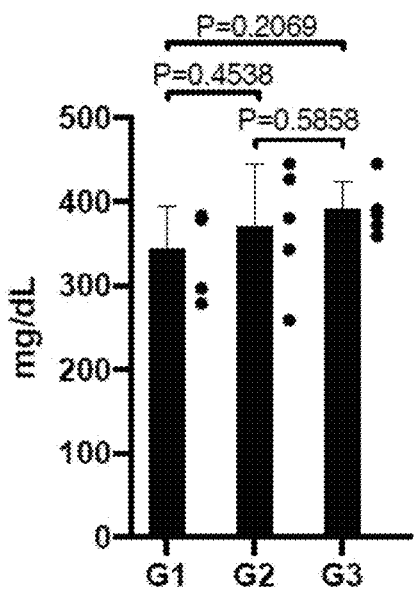

While free and total cholesterol levels in serum, at day 14, were similar for all three groups, the free cholesterol levels in the liver tissue of control mice was greater than that of either test group. Specifically, as shown in FIG. 2, total cholesterol levels in the liver tissue was substantially the same for G2 and G3 (avg. free cholesterol about 30 mg/dl). In contrast, the amount of total cholesterol in the livers of the control group (G1) was about 50% greater—free cholesterol about 45 mg/dl.

These results demonstrate that the presently disclosed construct, targeted to liver cells, is effective at reducing fatty liver in mice fed a high fat diet. As noted above, the serum cholesterol levels of the control mice, at two weeks, were similar to those of the treated groups. Moreover, no adverse effects were apparent at sacrifice.

Example 4—Expression of Recombinant Proteins in Liver Tissue

Results from studies described above, were confirmed by protein assay. Specifically, western blots were probed to confirm expression of the recombinant proteins in liver tissue. Briefly, liver tissue was harvested 2-wks after the injections. The tissue was homogenized in lysis buffer, lysates were loaded on SDS-polyacrylamide gels, separated by electrophoresis, and proteins transferred to appropriate membranes for western analysis. Membranes were subjected to western blotting using a FLAG (upper panel) antibody to recognize the FLAG tagged recombinant protein. The results are shown at FIG. 3.

Figure 3:
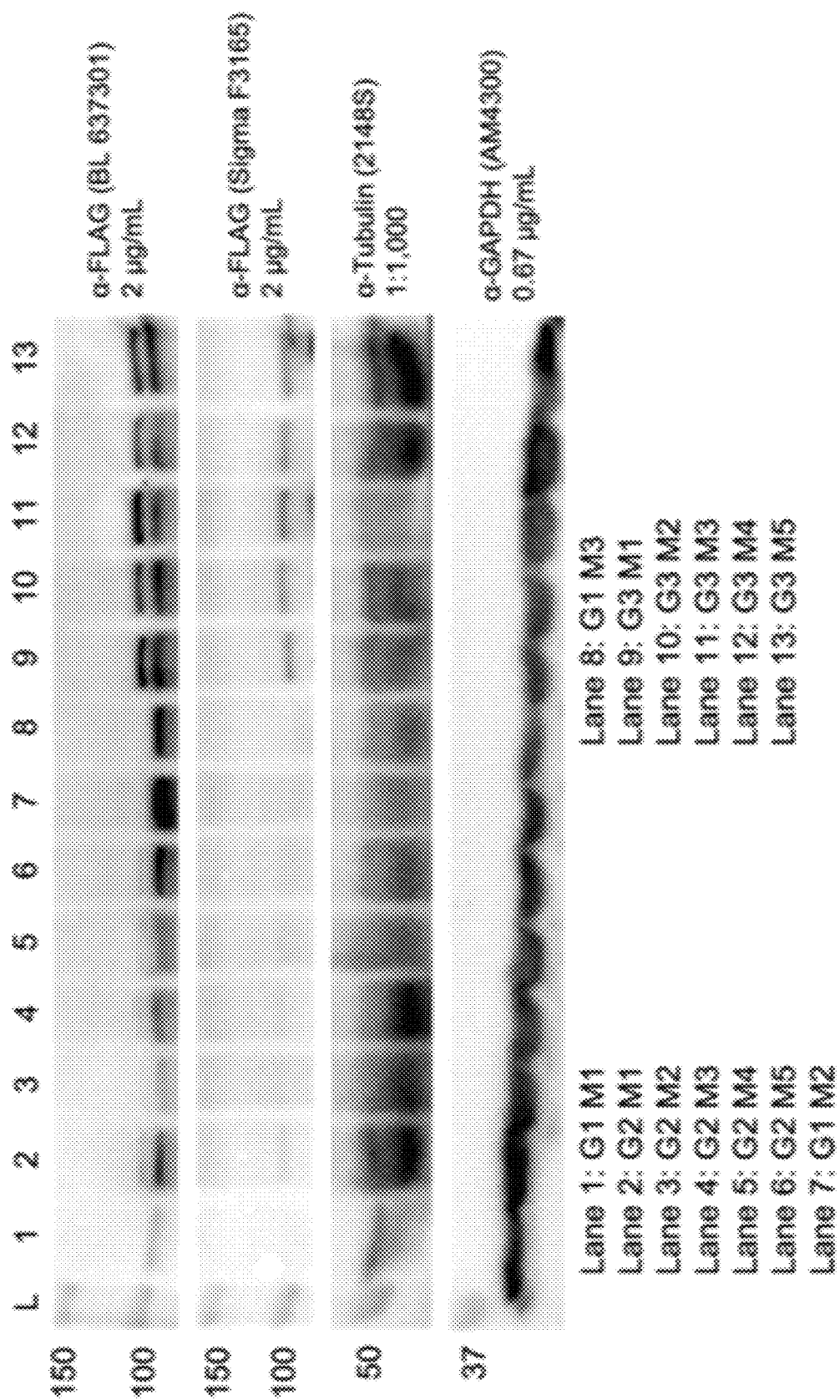
FIG. 3 is a western blot showing expression of proteins within the liver.
Figure 4:
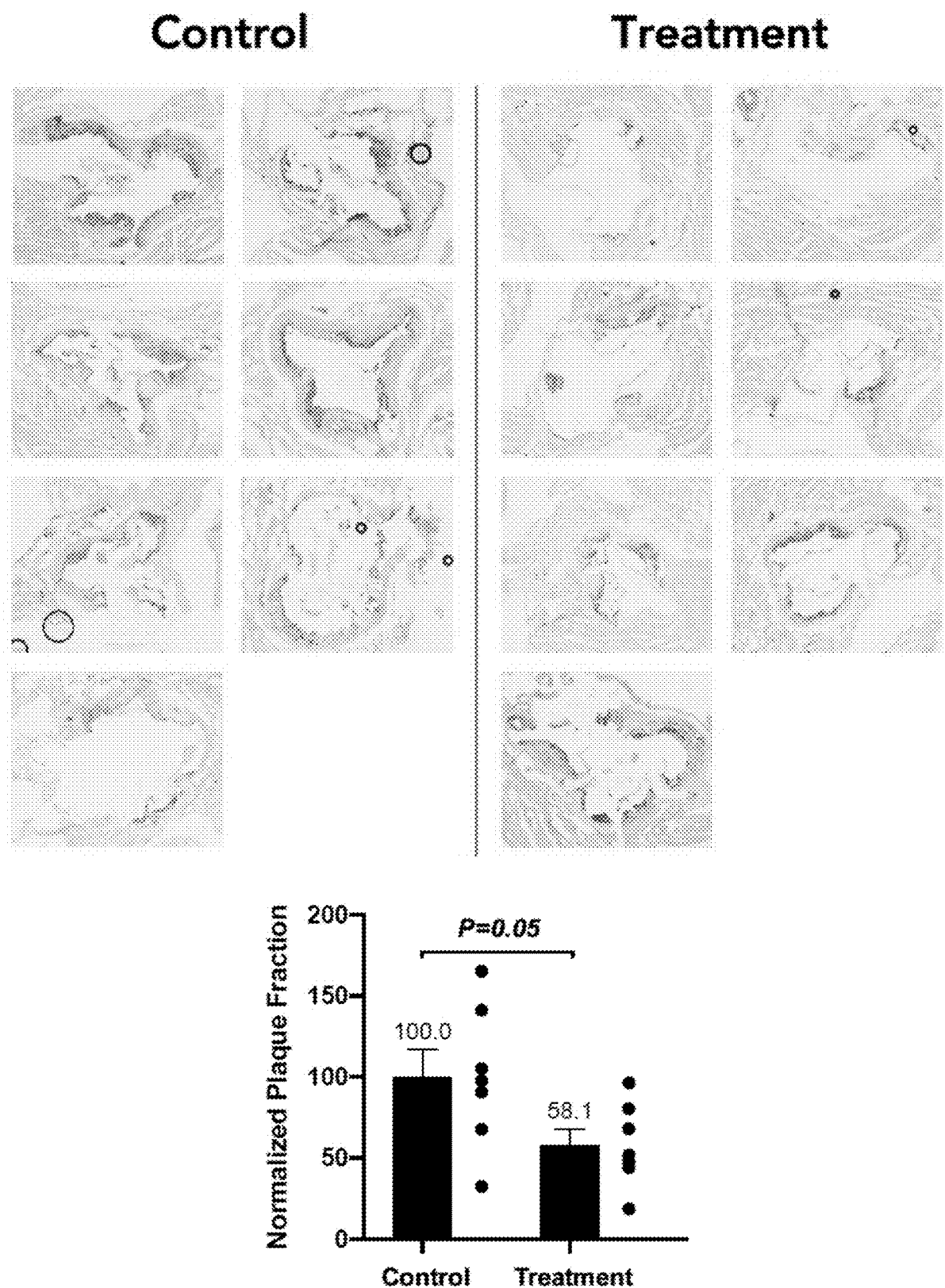
FIG. 4 shows result from treating atherosclerosis-prone mice with one embodiment of the disclosed compositions, cells, therapies, and/or methods.

As shown in FIG. 3 (top panel), expression of the recombinant protein (~120 kD) was specific to liver tissue from mice treated with the disclosed construct/cassette, while samples from control mice (empty vector; lanes 1, 7 and 8) did not react with the FLAG antibody. Loading was assayed by probing with anti-GAPDH & anti-Tubulin antibodies. These results are shown in two bottom panels of FIG. 3.

Overall the data indicates that vector containing the presently disclosed construct/cassette results in expression of the cholesterol-catalytic recombinant protein in liver tissues of treated mice.

Legend: G1, Group1—empty vector, served here as control; G2, Group2—AAV 1-HR, G3: Group3—AAV 6-HR. M: mouse.

Example 5—Cell Therapeutic Treatment of Atherosclerosis

Atherosclerosis prone mice, ApoE-null mice, are treated with in-vitro modified cells expressing one or more cholesterol degrading enzymes. Briefly, stem cells were modified with control expression vector or expression vector containing coding regions for one or more of the disclosed cholesterol metabolizing genes as described above.

After treatment, the mice are sacrificed to prepare histological sections of the aortic root, aortic arch (including the brachiocephalic artery, right subclavian artery, right common carotid artery, left common carotid artery and the left subclavian artery) and the aortic tree (descending/thoracic aorta and abdominal aorta). Sections are analyzed for changes, relative to the untreated, control mice. Specifically, the sections are analyzed to measure plaque area/vessel wall area and plaque area/vessel lumen area.

One or more of the following non-invasive imaging techniques may be used to assess changes in both atherosclerotic disease burden, plaque size, plaque composition, etc.: Non-invasive Carotid Ultrasound, Magnetic Resonance of the Carotid Arteries, Computed Tomography Coronary Angiography, Magnetic Resonance Imaging of the Coronary Arteries, and Positron emission tomography (PET). A PET tracer is used to aid in assessment. In one embodiment, the PET tracer is 18F-fluorodeoxyglucose (18F-FDG). PET tracer may be taken up by macrophages due to increased metabolic activity, and thereby identify macrophage cells relative to less active surrounding cells. This allows the PET tracer to act as a surrogate for inflammation. This provides an assessment of inflammatory plaque activity across multiple vascular beds. The disclosed approach has been used in the Cardiovascular Inflammation Reduction Trial (CIRT)—Imaging Study (NCT02576067).

Example 6—Gene Therapeutic Treatment of Atherosclerosis

Animal Care, Handling and Drug Administration:

Twenty male ApoE-null mice (jax.org/) were randomly separated into 3 study groups of 10, 5 and 5 mice/group. On study Day 0, all mice were implanted with a subcutaneous osmotic minipump (alzet.com/) to allow continuous angiotensin II release (0.7 mg/kg/day, 4 weeks) and placed on a high fat diet (insights.envigo.com) for 4 weeks. Mice were then returned to a normal chow diet, separated into three groups, and each group intravenously administered, via tail vein, one of the following:

Group 1 (n=10 mice)—$5 \times 10^{13}$ vg/kg of AAV6-Empty ($2 \times 10^{13}$ vg/mL);

Group 2—$5 \times 10^{13}$ vg/kg of AAV6-CDP (Cholesterol Degrading Proteins: $2 \times 10^{13}$ vg/mL);

Group 3—$5 \times 10^{13}$ vg/kg of AAV6-CDP ($2 \times 10^{13}$ vg/mL).

Groups 2 and 3 were injected with different batches of AAV6-CDP to determine whether there is variability between batches.

Animal Euthanasia, Tissue Harvesting and Processing:

Mice were euthanized on Day 28, post treatment by terminal euthanasia by $CO_2$ narcosis. Mice were bled through the mandibular vein collecting approximately 0.5 mL of blood, which was processed into serum for later analysis. Mice were then perfused slowly via the left ventricle with 10 mL of PBS+0.5 mM EDTA followed by 10 mL of PBS. Continuous outflow of the perfusate from the right atrium and the blanching of the liver were carefully monitored for gross assessment of efficient systemic perfusion. The liver, lung, spleen, kidneys, and brain were harvested and placed into ice-cold PBS and processed.

After systemic PBS+EDTA/PBS perfusion and removal of the specified organs, the heart/aortic tree structure was perfused with 5 mL of 10% neutral buffered formalin (NBF) via the left ventricle. This structure was then carefully removed from the animal, immersed into 10% NBF and stored at 4° C. overnight. Next, the tissue was placed into 15% sucrose for 6-12 hours (i.e. until the tissue sinks) at 4° C. and transferred to 30% sucrose overnight at 4° C. until the tissue sinks. The sucrose solutions are hypertonic and will dehydrate the tissue. As the tissue equilibrates with the 15% and 30% sucrose solutions, the tissue will sink to the bottom of the container. Sufficient dehydration of the tissue, prior to its freezing in OCT embedding medium, is paramount to prevent freezing damage artifacts due to the expansion of water crystals.

Heart and Aortic Tree are cut into 5 parts: (1) Heart-Aortic Root (HR-AR); (2) Thorax-I, or T1; (3) Thorax-II, or T2; (4) Abdomen-I, or A1; and (5) Abdomen-II, or A2. The methods of preparing these samples is briefly described below.

Heart-Aortic Root (HR-AR): The heart and aortic root were separated from the rest of the aortic tree. Using a scalpel blade the heart was cut along the red line shown in FIG. 5. Approximately 70% (from the apex to 3 mm away from the base, i.e. inferior portion) of the ventricles was cut away. The remaining HR-AR (superior portion) was placed into a tissue mold, and embedded in OCT making sure that the aortic root was positioned perpendicularly to the bottom surface of the tissue mold. The mold was snap frozen in isopentane chilled with dry ice for 3-5 minutes until the tissue block became solid and white. Tissue blocks were kept frozen on dry ice for 30 min and stored in −80° C. freezer until cryo-sectioning.

Figure 5:
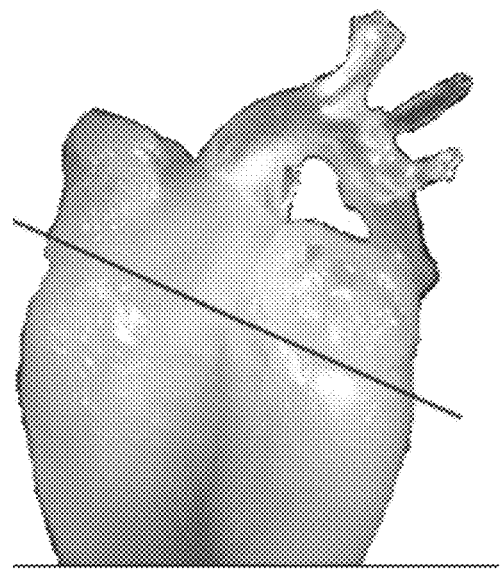
FIG. 5 are schematics showing dissection of heart (top) and aorta (bottom) sections.
Figure 5:
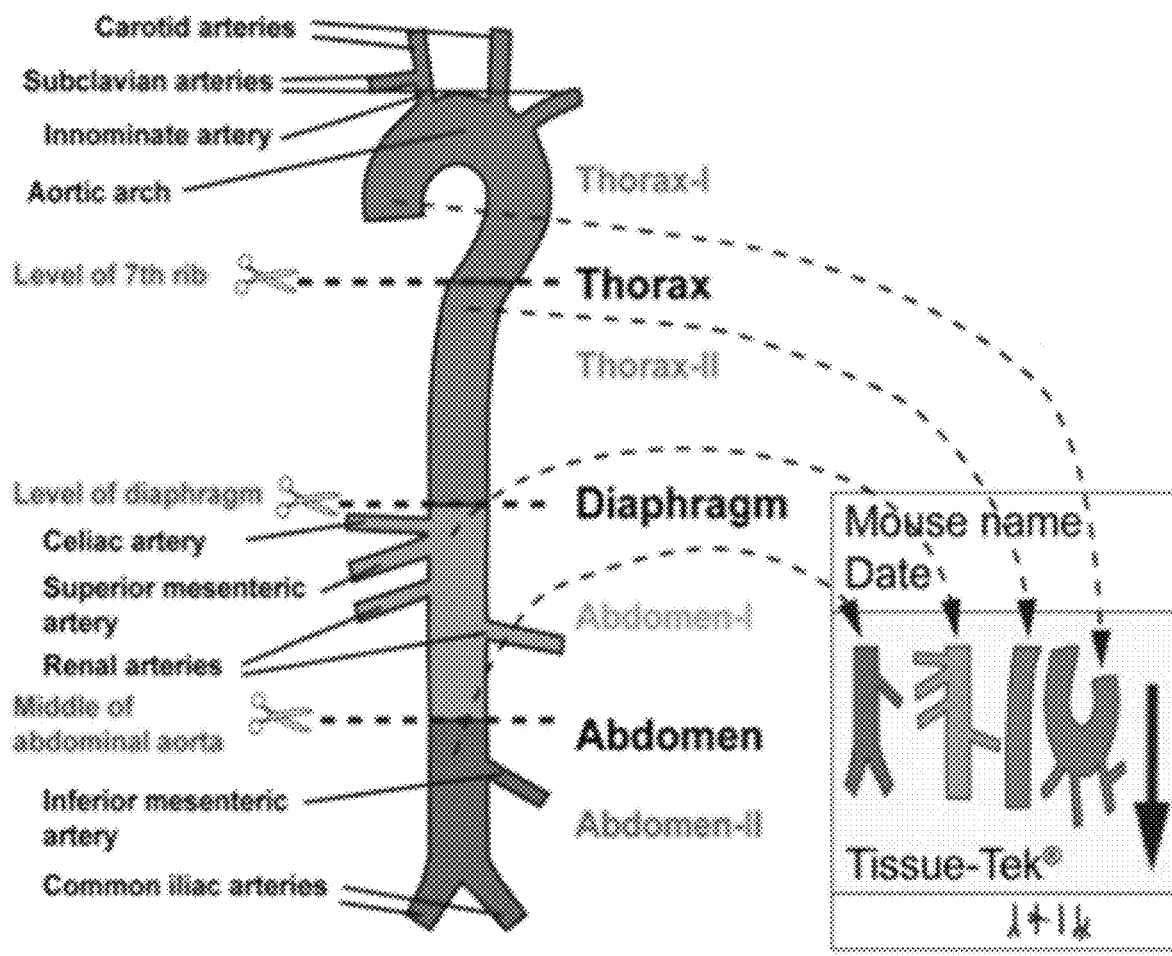

The remaining Aortic block comprising the Aortic Tree was then segmented as follows, and shown in the FIG. 5 (bottom). Briefly, the Thorax-I (T1) structure includes the aortic arch containing the innominate, the right subclavian, the right common carotid, the left carotid, and the left subclavian arteries, the Thorax-II (T2) structure includes the Aorta from the 7th rib up to the diaphragm including intercostal arteries, the Abdomen-I (A1) structure includes the Aorta below the diaphragm to the middle of the abdominal aorta including the celiac, the superior mesenteric and the right/left renal arteries. The Abdomen-II (A2) structure includes the Aorta rom the middle of the abdominal aorta to below the level of iliac bifurcation including the inferior mesenteric, and the common iliac arteries at the iliac bifurcation.

The T1, T2, A1 and A2 structures were immersed to the same depth into a common cryomold containing OCT embedding medium and in the proper orientation as shown in the figure. The mold was snap frozen in isopentane chilled with dry ice for 3-5 min until the tissue block became solid and white. Tissue blocks were kept frozen on dry ice for 30 min and stored in −80° C. freezer until cryosectioning. The blocks were sectioned as follows: Heart-AR block—The ventricular tissue was sectioned and discarded until the aortic sinus was reached. This is identified by checking under the microscope until the appearance of the 3 aortic valves. Once all aortic valves appear, 10 μm sections were cut and mounted on slides as 10 μm serial sections. Slides were then stained for Oil Red O/Mayer's hematoxylin. Thorax I, Thorax II, Abdomen I and Abdomen II blocks (i.e. 4 Aorta blocks)—10 μm thick serial sections, with every $10^{th}$ serial section at 100 μm intervals used for Oil Red O/Meyer's Hematoxylin. Based on Oil Red O/H&E data, selected serial sections (e.g. $12^{th}$, $13^{th}$, $14^{th}$ and $15^{th}$ sections) are stained for Flag, F4/80, CD45 and α-SMC actin, respectively.

The Oil Red O Staining Protocol is as follows. ORO stock is prepared by adding 2.5 g of ORO to 400 mL of 99% (vol/vol) isopropanol and mixing by magnetic stirring for 2 h at room temperature (RT). For the ORO working solution, 1.5 parts of ORO stock solution was added to one part of distilled water. The solution was left to stand for 10 min at 4° C. filtered through a 45-μm filter. Frozen sections were equilibrated for 10 min at room temperature (RT), rinsed with 60% isopropanol and incubated with ORO working solution at room temperature (RT) for 15 minutes. Sections were rinsed with 60% isopropanol, counterstained with Mayer's hematoxylin, rinsed under running tap water and cover-slipped.

Plaque burden is assessed as follows. The level of plaque burden was quantified by determining plaque area and the vessel lumen area and calculating a ratio by dividing total plaque area by total vessel lumen area. Ratios were determined for both control treated and CDP-treated mice.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, will control.

Although the present disclosure has been described with a certain degree of particularity, it is understood the disclosure has been made by way of example, and changes in detail or structure may be made without departing from the spirit of the disclosure as defined in the appended claims.

We claim:

1. A method of reducing lipid concentration in at least one liver cell of a subject in need of treatment for a cholesterol related disease or condition, the method comprising the steps of:
   contacting a vector comprising a construct with the liver cell of the subject, wherein the construct comprises a nucleic acid sequence of SEQ ID NO: 1 or 13;
   allowing the construct to enter the liver cell of the subject and create a modified liver cell;
   allowing the modified liver cell to degrade lipid within the modified cell and reduce the size of at least one atheroma in the subject, wherein the lipid is cholesterol and the atheroma is located at or near the aorta of the subject.

2. The method of claim 1, wherein the construct comprises SEQ ID NO: 1.

3. The method of claim 2, wherein the construct is a nucleic acid comprising a eukaryotic promoter sequence of CMV promoter sequence.

4. The method of claim 2, wherein the modified liver cell is a hepatocyte.

5. The method of claim 4, wherein the cholesterol related disease or condition is selected from one or more of atherosclerosis, cardiovascular disease (CVD), myocardial infarction, stroke, peripheral vascular disease, diabetes, hypothyroidism, kidney disease, liver disease, fatty liver, non-alcoholic fatty liver disease (NAFLD), obesity, nonalcoholic steatohepatitis (NASH), cirrhosis of the liver, hepatitis, and liver fibrosis.

6. The method of claim 1, wherein the liver cell of the subject is derived from a stem cell.

7. The method of claim 6, wherein the stem cell is an induced pluripotent stem cell.

8. The method of claim 1, wherein the liver cell of the subject is a differentiated mammalian liver cell.

9. The method of claim 1, wherein the modified liver cell is administered to the subject.

10. The method of claim 5, wherein the subject suffers from fatty liver or NAFLD.

11. The method of claim 1, wherein the modified liver cell is a hepatocyte within the liver of the subject.

12. The method of claim 1, wherein the vector is a viral vector.

13. The method of claim 12, wherein the vector contacts the liver cell of the subject within the subject.

14. The method of claim 1, wherein the vector is a lipid nanoparticle.

15. The method of claim 14, wherein the vector contacts the liver cell of the subject within the subject.

16. A method of reducing lipid concentration in at least one target cell of a subject in need of treatment for atherosclerosis, the method comprising the steps of:
   contacting a vector comprising a construct with a liver cell of the subject, wherein the construct comprises a nucleic acid sequence of SEQ ID NO:1;
   allowing the construct to enter the liver cell of the subject and create a modified liver cell;
   allowing the modified liver cell to degrade lipid in the modified liver cell, wherein the lipid is cholesterol;
   reducing the lipid concentration in the at least one target cell, wherein the target cell is located in an atheroma of the subject and the modified liver cell is in the liver of the subject, and the subject suffers from type II, type III, type IV, and/or type V lesions or atheromas; and
   reducing a size of at least one lesion or atheroma, wherein the atheroma is located at or near the aorta of the subject.

\* \* \* \* \*

SEQUENCE LISTING

<160> NUMBER OF SEQ ID NOS: 13

<210> SEQ ID NO 1

```
<211> LENGTH: 3369
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 1
atgctggcca agggcctgcc tcctagaagc gtgctcgtga agggctgcca gaccttcctg      60 agcgcccta gagaaggcct gggcagactg agagtgccta caggcgaagg cgccggaatc     120
agcaccagaa gccccagacc cttcaacgag atccccagcc ctggcgacaa cggctggctg     180
aacctgtacc acttctggcg ggaaaccggc acccacaaag tgcatctgca ccacgtgcag     240
aacttccaga gtacggcccc catctaccgc gagaagctgg gcaacgtgga aagcgtgtac     300
gtgatcgacc ccgaggacgt ggccctgctg tttaagagcg agggccccaa ccccgagcgg     360
ttcctgattc ctccttgggt ggcctaccac cagtactacc agaggcccat cggcgtgctg     420
ctgaagaagt ccgccgcctg gaagaaagac cgggtggccc tgaaccagga agtgatggcc     480
cctgaggcca ccaagaactt tctgcccctg ctggacgccg tgtccagaga ctttgtgtcc     540
gtgctgcacc ggcggatcaa gaaggccggc agcggcaatt acagcggcga catcagcgac     600
gacctgttca gattcgcctt cgagagcatc accaacgtga tcttcggcga gcggcagggc     660
atgctggaag aggtcgtgaa tcccgaggcc cagcggttca tcgacgccat ctaccagatg     720
ttccacacca gcgtgcccat gctgaatctg ccccccgacc tgtttcggct gttccggacc     780
aagacctgga aggaccatgt ggccgcctgg atgtgatct tcagcaaggc cgacatctac     840
acccagaact tctactggga gctgcggcag aaaggcagcg tgcaccacga ctaccggggc     900
atcctgtaca gactgctggg cgacagcaag atgagcttcg aggacatcaa ggccaacgtg     960
accgagatgc tggctggcgg cgtggacacc accagcatga ctctgcagtg gcacctgtac    1020 gagatgccc ggaacctgaa ggtgcaggac atgctgagag ccgaggtgct ggccgccaga     1080
catcaggctc agggcgatat ggccacaatg ctgcagctgg tgcctctgct gaaggccagc     1140
atcaaagaga cactgcggct gcaccccatc agcgtgaccc tgcagagata cctcgtgaac    1200
gacctggtgc tgcgggacta catgatcccc gccaagaccc tggtgcaggt ggccatctat    1260
gccctgggaa gagagcctac attcttcttc gaccctgaaa acttcgaccc cacccggtgg    1320
ctgagcaagg acaagaacat cacctacttc cgcaacctgg gcttcggctg gggcgtgcgg    1380
cagtgtctgg gcagaagaat cgccgagctg gaaatgacca tcttcctgat caatatgctg    1440
gaaaacttcc gggtggaaat ccagcacctg agcgacgtgg caccaccttt caacctgatc    1500
ctgatgcccg agaagcctat cagcttcacc ttctggccct tcaatcagga agccacccag    1560
cagaccgacg gcaccagcag cacccaggaa aagacccccc agatctgcgt cgtgggctct    1620
ggacctgccg gcttttacac agcccagcat ctgctgaaac accccaggc ccacgtggac    1680 atctacgaga gcagcccgt gcccttcggc ctggtgcgct tggagtggc cccagatcac     1740 cccgaagtga agaacgtgat caacaccttc acccagaccg cccacagcgg cagatgtgcc    1800
ttctggggca atgtggaagt gggccgggat gtgaccgtgc cgaactgag ggaagcctac     1860 catgccgtgg tgctgagcta cggcgccgag gatcatcggg ccctggaaat ccctggcgag    1920
gaactgcctg gcgtgtgtag cgccagagcc ttcgtgggct ggtacaacgg cctgcccgaa    1980
aaccaggaac tggaacccga cctgagctgc gacaccgccg tgattctggg ccagggaaat    2040
gtggccctgg atgtggccag aatcctgctg accccctccg agcacctgga agaaccgac    2100
```

```
atcaccaagg ccgccctggg cgtgctgaga cagagcagag tgaaaaccgt gtggctcgtg    2160
ggcagacggg gacctctgca ggtggcattc accatcaaag aactgcgcga gatgatccag    2220
ctgccaggcg ccagacccat cctggaccct gtggatttcc tgggactgca ggacaagatc    2280
aaagaggtgc ccagacccg gaagcggctg acagaactgc tgctgagaac cgccacagag    2340
aagcctggcc ctgccgaagc tgctagacag gcctctgcct ctagagcctg ggcctgcgg    2400 ttcttcagat cccctcagca ggtgctgcct agccccgatg ggagaagggc agctggcgtg    2460
cgcctggctg tgactagact ggaaggcgtg gacgaggcca aagagccgt gccaacaggg    2520 gacatggaag atctgccctg cggactggtg ctgtccagca tcggctacaa gagcagaccc    2580 gtggaccct ccgtgccttt cgatagcaag ctgggcgtga tccctaacgt ggaaggcaga    2640
gtgatggacg tgcccggcct gtactgttcc ggctgggtca aaaggggccc cacaggcgtg    2700
atcgccacaa caatgaccga cagcttcctg accggccaga tgctgctgca ggacctgaaa    2760
gccggcctgc tgccatctgg ccctagacct ggatatgccg ccatccaggc tctgctgtcc    2820
tcacggggag tgcggcctgt gtccttcagc gactgggaga aactggatgc cgaagaggtg    2880 gccagggac agggcactgg caagcccaga gaaaagctgg tggaccctca ggaaatgctg    2940
cgcctgctgg ccatacaga tggcgccagc agcagctccg aggataagat caccgtgcac    3000
ttcatcaacc gggacggcga gacactgacc accaagggca agtgggcga ctctctgctg    3060 gacgtggtgg tggaaaacaa cctggacatc gacggcttcg gcgcctgcga gggaacactg    3120
gcctgtagca cctgtcacct gatcttcgag gatcacatct acgaaaagct ggacgccatc    3180
accgacgaag agaacgacat gctggacctg gcctacggcc tgaccgatag aagcagactg    3240
ggctgtcaga tctgcctgac caagagcatg acaacatga ccgtgcgggt gcccgagaca    3300
gtggccgatg ccagacagtc catcgatgtg gcaagacca gcgactacaa ggacgacgac    3360
gacaagtga                                                            3369
```

<210> SEQ ID NO 2
<211> LENGTH: 1122
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 2

```
Met Leu Ala Lys Gly Leu Pro Pro Arg Ser Val Leu Val Lys Gly Cys
1               5                   10                  15

Gln Thr Phe Leu Ser Ala Pro Arg Glu Gly Leu Gly Arg Leu Arg Val
            20                  25                  30

Pro Thr Gly Glu Gly Ala Gly Ile Ser Thr Arg Ser Pro Arg Pro Phe
        35                  40                  45

Asn Glu Ile Pro Ser Pro Gly Asp Asn Gly Trp Leu Asn Leu Tyr His
    50                  55                  60

Phe Trp Arg Glu Thr Gly Thr His Lys Val His Leu His His Val Gln
65                  70                  75                  80

Asn Phe Gln Lys Tyr Gly Pro Ile Tyr Arg Glu Lys Leu Gly Asn Val
                85                  90                  95

Glu Ser Val Tyr Val Ile Asp Pro Glu Asp Val Ala Leu Leu Phe Lys
            100                 105                 110

Ser Glu Gly Pro Asn Pro Glu Arg Phe Leu Ile Pro Pro Trp Val Ala
```

```
                115                 120                 125
Tyr His Gln Tyr Tyr Gln Arg Pro Ile Gly Val Leu Lys Lys Ser
            130                 135                 140
Ala Ala Trp Lys Lys Asp Arg Val Ala Leu Asn Gln Glu Val Met Ala
145                 150                 155                 160
Pro Glu Ala Thr Lys Asn Phe Leu Pro Leu Leu Asp Ala Val Ser Arg
                165                 170                 175
Asp Phe Val Ser Val Leu His Arg Arg Ile Lys Lys Ala Gly Ser Gly
            180                 185                 190
Asn Tyr Ser Gly Asp Ile Ser Asp Leu Phe Arg Phe Ala Phe Glu
        195                 200                 205
Ser Ile Thr Asn Val Ile Phe Gly Glu Arg Gln Gly Met Leu Glu Glu
        210                 215                 220
Val Val Asn Pro Glu Ala Gln Arg Phe Ile Asp Ala Ile Tyr Gln Met
225                 230                 235                 240
Phe His Thr Ser Val Pro Met Leu Asn Leu Pro Pro Asp Leu Phe Arg
                245                 250                 255
Leu Phe Arg Thr Lys Thr Trp Lys Asp His Val Ala Ala Trp Asp Val
            260                 265                 270
Ile Phe Ser Lys Ala Asp Ile Tyr Thr Gln Asn Phe Tyr Trp Glu Leu
        275                 280                 285
Arg Gln Lys Gly Ser Val His His Asp Tyr Arg Gly Ile Leu Tyr Arg
    290                 295                 300
Leu Leu Gly Asp Ser Lys Met Ser Phe Glu Asp Ile Lys Ala Asn Val
305                 310                 315                 320
Thr Glu Met Leu Ala Gly Gly Val Asp Thr Thr Ser Met Thr Leu Gln
                325                 330                 335
Trp His Leu Tyr Glu Met Ala Arg Asn Leu Lys Val Gln Asp Met Leu
            340                 345                 350
Arg Ala Glu Val Leu Ala Ala Arg His Gln Ala Gln Gly Asp Met Ala
        355                 360                 365
Thr Met Leu Gln Leu Val Pro Leu Leu Lys Ala Ser Ile Lys Glu Thr
    370                 375                 380
Leu Arg Leu His Pro Ile Ser Val Thr Leu Gln Arg Tyr Leu Val Asn
385                 390                 395                 400
Asp Leu Val Leu Arg Asp Tyr Met Ile Pro Ala Lys Thr Leu Val Gln
                405                 410                 415
Val Ala Ile Tyr Ala Leu Gly Arg Glu Pro Thr Phe Phe Asp Pro
            420                 425                 430
Glu Asn Phe Asp Pro Thr Arg Trp Leu Ser Lys Asp Lys Asn Ile Thr
        435                 440                 445
Tyr Phe Arg Asn Leu Gly Phe Gly Trp Gly Val Arg Gln Cys Leu Gly
        450                 455                 460
Arg Arg Ile Ala Glu Leu Glu Met Thr Ile Phe Leu Ile Asn Met Leu
465                 470                 475                 480
Glu Asn Phe Arg Val Glu Ile Gln His Leu Ser Asp Val Gly Thr Thr
                485                 490                 495
Phe Asn Leu Ile Leu Met Pro Glu Lys Pro Ile Ser Phe Thr Phe Trp
            500                 505                 510
Pro Phe Asn Gln Glu Ala Thr Gln Gln Thr Asp Gly Thr Ser Ser Thr
        515                 520                 525
Gln Glu Lys Thr Pro Gln Ile Cys Val Val Gly Ser Gly Pro Ala Gly
    530                 535                 540
```

```
Phe Tyr Thr Ala Gln His Leu Leu Lys His Pro Gln Ala His Val Asp
545                 550                 555                 560

Ile Tyr Glu Lys Gln Pro Val Pro Phe Gly Leu Val Arg Phe Gly Val
            565                 570                 575

Ala Pro Asp His Pro Glu Val Lys Asn Val Ile Asn Thr Phe Thr Gln
        580                 585                 590

Thr Ala His Ser Gly Arg Cys Ala Phe Trp Gly Asn Val Glu Val Gly
    595                 600                 605

Arg Asp Val Thr Val Pro Glu Leu Arg Glu Ala Tyr His Ala Val Val
610                 615                 620

Leu Ser Tyr Gly Ala Glu Asp His Arg Ala Leu Glu Ile Pro Gly Glu
625                 630                 635                 640

Glu Leu Pro Gly Val Cys Ser Ala Arg Ala Phe Val Gly Trp Tyr Asn
            645                 650                 655

Gly Leu Pro Glu Asn Gln Glu Leu Glu Pro Asp Leu Ser Cys Asp Thr
        660                 665                 670

Ala Val Ile Leu Gly Gln Gly Asn Val Ala Leu Asp Val Ala Arg Ile
    675                 680                 685

Leu Leu Thr Pro Pro Glu His Leu Glu Arg Thr Asp Ile Thr Lys Ala
690                 695                 700

Ala Leu Gly Val Leu Arg Gln Ser Arg Val Lys Thr Val Trp Leu Val
705                 710                 715                 720

Gly Arg Arg Gly Pro Leu Gln Val Ala Phe Thr Ile Lys Glu Leu Arg
            725                 730                 735

Glu Met Ile Gln Leu Pro Gly Ala Arg Pro Ile Leu Asp Pro Val Asp
        740                 745                 750

Phe Leu Gly Leu Gln Asp Lys Ile Lys Glu Val Pro Arg Pro Arg Lys
    755                 760                 765

Arg Leu Thr Glu Leu Leu Leu Arg Thr Ala Thr Glu Lys Pro Gly Pro
770                 775                 780

Ala Glu Ala Ala Arg Gln Ala Ser Ala Ser Arg Ala Trp Gly Leu Arg
785                 790                 795                 800

Phe Phe Arg Ser Pro Gln Gln Val Leu Pro Ser Pro Asp Gly Arg Arg
            805                 810                 815

Ala Ala Gly Val Arg Leu Ala Val Thr Arg Leu Glu Gly Val Asp Glu
        820                 825                 830

Ala Thr Arg Ala Val Pro Thr Gly Asp Met Glu Asp Leu Pro Cys Gly
    835                 840                 845

Leu Val Leu Ser Ser Ile Gly Tyr Lys Ser Arg Pro Val Asp Pro Ser
850                 855                 860

Val Pro Phe Asp Ser Lys Leu Gly Val Ile Pro Asn Val Glu Gly Arg
865                 870                 875                 880

Val Met Asp Val Pro Gly Leu Tyr Cys Ser Gly Trp Val Lys Arg Gly
            885                 890                 895

Pro Thr Gly Val Ile Ala Thr Thr Met Thr Asp Ser Phe Leu Thr Gly
        900                 905                 910

Gln Met Leu Leu Gln Asp Leu Lys Ala Gly Leu Leu Pro Ser Gly Pro
    915                 920                 925

Arg Pro Gly Tyr Ala Ala Ile Gln Ala Leu Leu Ser Ser Arg Gly Val
930                 935                 940

Arg Pro Val Ser Phe Ser Asp Trp Glu Lys Leu Asp Ala Glu Glu Val
945                 950                 955                 960
```

Ala Arg Gly Gln Gly Thr Gly Lys Pro Arg Glu Lys Leu Val Asp Pro
                965                 970                 975

Gln Glu Met Leu Arg Leu Leu Gly His Thr Asp Gly Ala Ser Ser Ser
            980                 985                 990

Ser Glu Asp Lys Ile Thr Val His Phe Ile Asn Arg Asp Gly Glu Thr
        995                1000                1005

Leu Thr Thr Lys Gly Lys Val Gly Asp Ser Leu Leu Asp Val Val
    1010                1015                1020

Val Glu Asn Asn Leu Asp Ile Asp Gly Phe Gly Ala Cys Glu Gly
    1025                1030                1035

Thr Leu Ala Cys Ser Thr Cys His Leu Ile Phe Glu Asp His Ile
    1040                1045                1050

Tyr Glu Lys Leu Asp Ala Ile Thr Asp Glu Glu Asn Asp Met Leu
    1055                1060                1065

Asp Leu Ala Tyr Gly Leu Thr Asp Arg Ser Arg Leu Gly Cys Gln
    1070                1075                1080

Ile Cys Leu Thr Lys Ser Met Asp Asn Met Thr Val Arg Val Pro
    1085                1090                1095

Glu Thr Val Ala Asp Ala Arg Gln Ser Ile Asp Val Gly Lys Thr
    1100                1105                1110

Ser Asp Tyr Lys Asp Asp Asp Asp Lys
    1115                1120

<210> SEQ ID NO 3
<211> LENGTH: 1767
<212> TYPE: DNA
<213> ORGANISM: Artificial Sequence
<220> FEATURE:
<221> NAME/KEY: source
<223> OTHER INFORMATION: /note="Description of Artificial Sequence:
    Synthetic polynucleotide"

<400> SEQUENCE: 3
cctggagatc ctgttgactg tagcatggag ggggcttgtg cagctgaatg tctgcatgca      60
ggtggtggga gttctggaat atgatggagc tggaggtggg aagagaagta ggcttggggc     120
agctctctca tgccacctca ttctggccaa aactcaggtc aaactgtgaa gagtctaaat     180
gtgaatctgc ccttcaaggt ggctacaaag gtatctttgt caaggtagga gaccttgtgg     240
cctccacgtg cacttccagg gcctgcttgg gcctcttcta cgggtctgtc ctgagtcttc     300
tatgaatctg tccttcaggg cagattcata tttagactct tcacagtttg acctgagttt     360
tggccagaat aaggtgacat ttagtttgtt ggcttgatgg atgacttaaa tatttagaca     420
tggtgtgtag gcctgcattc ctactcttgc cttttttttt gcccctccag tgttttgggt     480
agttttgctc ccctacagcc aaaggcaaac agagaagttg gaggtctgga gtggctacat     540
aattttacac gactgcaatt ctctggctgc acttcacaaa tgtatacaaa ctaaatacaa     600
gtcctgtgtt tttatcacag ggaggctgat caatataatg aaattaaaag ggggctggtc     660
catattgttc tgtgtttttg tttgtttgtt ttgtttgttt ctttttttgt ttttgtggcc     720
tccttcctct caatttatga agagaagcag taagatgttc ctctcgggtc ctctgaggga     780
cctggggagc tcaggctggg aatctccaag gcagtaggtc gcctatcaaa atcaaagtc     840 caggtttgtg gggggaaaac aaaagcagcc cattacccag aggactgtcc gccttcccct     900
caccccagcc taggcctttg aaaggaaaca aaagacaaga caaatgatt ggcgtcctga     960 gggagattca gcctagagct ctctctcccc caatcccttc ctccggctga ggaaactaac    1020

-continued

```
aaaggaaaaa aaaattgcgg aaagcaggat ttagaggaag caaattccac tggtgccctt    1080
ggctgccggg aacgtggact agagagtctg cggcgcagcc ccgagcccag cgcttcccgc    1140
gcgtcttagg ccggcgggcc cgggcggggg aaggggacgc agaccgcgga ccctaagaca    1200
cctgctgtac cctccacccc caccccacct cacccacctc ccccaactc cctagatgtg     1260 tcgtgggcgg ctgaacgtcg cccgtttaag gggcgggccc cggctccacg tgctttctgc    1320
tgagtgactg aactacataa acagaggccg ggaagggggc ggggaggagg gagagcacag    1380
gctttgaccg atagtaacct ctgcgctcgg tgcagccgaa tctataaaag gaactagtcc    1440
cggcaaaaac cccgtaattg cgagcgagag tgagtgggc cgggaccggc agagccgagc     1500
cgacccttct ctcccgggct gcggcagggc agggcgggga gctccgcgca ccaacagagc    1560
cggttctcag ggcgctttgc tccttgtttt ttccccggtt ctgttttctc cccttctccg    1620
gaaggcttgt caagggtag gagaaagaga cgcaaacaca aaagtggaaa acagttaatg     1680
accagccacg ggcgtccctg ctgtgagctc tggccgctgc cttccaggc tcccgagcca     1740 cacgctgggc gtgctggctg agggaac                                        1767
```

<210> SEQ ID NO 4
<211> LENGTH: 521
<212> TYPE: PRT
<213> ORGANISM: Homo sapiens

<400> SEQUENCE: 4

```
Met Leu Ala Lys Gly Leu Pro Pro Arg Ser Val Leu Val Lys Gly Cys
1               5                   10                  15

Gln Thr Phe Leu Ser Ala Pro Arg Glu Gly Leu Gly Arg Leu Arg Val
            20                  25                  30

Pro Thr Gly Glu Gly Ala Gly Ile Ser Thr Arg Ser Pro Arg Pro Phe
        35                  40                  45

Asn Glu Ile Pro Ser Pro Gly Asp Asn Gly Trp Leu Asn Leu Tyr His
    50                  55                  60

Phe Trp Arg Glu Thr Gly Thr His Lys Val His Leu His His Val Gln
65                  70                  75                  80

Asn Phe Gln Lys Tyr Gly Pro Ile Tyr Arg Glu Lys Leu Gly Asn Val
                85                  90                  95

Glu Ser Val Tyr Val Ile Asp Pro Glu Asp Val Ala Leu Leu Phe Lys
            100                 105                 110

Ser Glu Gly Pro Asn Pro Glu Arg Phe Leu Ile Pro Pro Trp Val Ala
        115                 120                 125

Tyr His Gln Tyr Tyr Gln Arg Pro Ile Gly Val Leu Leu Lys Lys Ser
    130                 135                 140

Ala Ala Trp Lys Lys Asp Arg Val Ala Leu Asn Gln Glu Val Met Ala
145                 150                 155                 160

Pro Glu Ala Thr Lys Asn Phe Leu Pro Leu Leu Asp Ala Val Ser Arg
                165                 170                 175

Asp Phe Val Ser Val Leu His Arg Arg Ile Lys Lys Ala Gly Ser Gly
            180                 185                 190

Asn Tyr Ser Gly Asp Ile Ser Asp Asp Leu Phe Arg Phe Ala Phe Glu
        195                 200                 205

Ser Ile Thr Asn Val Ile Phe Gly Glu Arg Gln Gly Met Leu Glu Glu
    210                 215                 220

Val Val Asn Pro Glu Ala Gln Arg Phe Ile Asp Ala Ile Tyr Gln Met
225                 230                 235                 240
```

-continued

Phe His Thr Ser Val Pro Met Leu Asn Leu Pro Pro Asp Leu Phe Arg
                245                 250                 255

Leu Phe Arg Thr Lys Thr Trp Lys Asp His Val Ala Ala Trp Asp Val
        260                 265                 270

Ile Phe Ser Lys Ala Asp Ile Tyr Thr Gln Asn Phe Tyr Trp Glu Leu
        275                 280                 285

Arg Gln Lys Gly Ser Val His His Asp Tyr Arg Gly Ile Leu Tyr Arg
        290                 295                 300

Leu Leu Gly Asp Ser Lys Met Ser Phe Glu Asp Ile Lys Ala Asn Val
305                 310                 315                 320

Thr Glu Met Leu Ala Gly Gly Val Asp Thr Thr Ser Met Thr Leu Gln
                325                 330                 335

Trp His Leu Tyr Glu Met Ala Arg Asn Leu Lys Val Gln Asp Met Leu
                340                 345                 350

Arg Ala Glu Val Leu Ala Ala Arg His Gln Ala Gln Gly Asp Met Ala
        355                 360                 365

Thr Met Leu Gln Leu Val Pro Leu Leu Lys Ala Ser Ile Lys Glu Thr
        370                 375                 380

Leu Arg Leu His Pro Ile Ser Val Thr Leu Gln Arg Tyr Leu Val Asn
385                 390                 395                 400

Asp Leu Val Leu Arg Asp Tyr Met Ile Pro Ala Lys Thr Leu Val Gln
                405                 410                 415

Val Ala Ile Tyr Ala Leu Gly Arg Glu Pro Thr Phe Phe Phe Asp Pro
                420                 425                 430

Glu Asn Phe Asp Pro Thr Arg Trp Leu Ser Lys Asp Lys Asn Ile Thr
        435                 440                 445

Tyr Phe Arg Asn Leu Gly Phe Gly Trp Gly Val Arg Gln Cys Leu Gly
        450                 455                 460

Arg Arg Ile Ala Glu Leu Glu Met Thr Ile Phe Leu Ile Asn Met Leu
465                 470                 475                 480

Glu Asn Phe Arg Val Glu Ile Gln His Leu Ser Asp Val Gly Thr Thr
                485                 490                 495

Phe Asn Leu Ile Leu Met Pro Glu Lys Pro Ile Ser Phe Thr Phe Trp
                500                 505                 510

Pro Phe Asn Gln Glu Ala Thr Gln Gln
        515                 520

<210> SEQ ID NO 5
<211> LENGTH: 491
<212> TYPE: PRT
<213> ORGANISM: Homo sapiens

<400> SEQUENCE: 5

Met Ala Ser Arg Cys Trp Arg Trp Trp Gly Trp Ser Ala Trp Pro Arg
1               5                   10                  15

Thr Arg Leu Pro Pro Ala Gly Ser Thr Pro Ser Phe Cys His His Phe
                20                  25                  30

Ser Thr Gln Glu Lys Thr Pro Gln Ile Cys Val Val Gly Ser Gly Pro
        35                  40                  45

Ala Gly Phe Tyr Thr Ala Gln His Leu Leu Lys His Pro Gln Ala His
        50                  55                  60

Val Asp Ile Tyr Glu Lys Gln Pro Val Pro Phe Gly Leu Val Arg Phe
65                  70                  75                  80

Gly Val Ala Pro Asp His Pro Glu Val Lys Asn Val Ile Asn Thr Phe
                85                  90                  95

-continued

Thr Gln Thr Ala His Ser Gly Arg Cys Ala Phe Trp Gly Asn Val Glu
            100                 105                 110

Val Gly Arg Asp Val Thr Val Pro Glu Leu Arg Glu Ala Tyr His Ala
        115                 120                 125

Val Val Leu Ser Tyr Gly Ala Glu Asp His Arg Ala Leu Glu Ile Pro
    130                 135                 140

Gly Glu Glu Leu Pro Gly Val Cys Ser Ala Arg Ala Phe Val Gly Trp
145                 150                 155                 160

Tyr Asn Gly Leu Pro Glu Asn Gln Glu Leu Glu Pro Asp Leu Ser Cys
                165                 170                 175

Asp Thr Ala Val Ile Leu Gly Gln Gly Asn Val Ala Leu Asp Val Ala
            180                 185                 190

Arg Ile Leu Leu Thr Pro Pro Glu His Leu Glu Arg Thr Asp Ile Thr
        195                 200                 205

Lys Ala Ala Leu Gly Val Leu Arg Gln Ser Arg Val Lys Thr Val Trp
    210                 215                 220

Leu Val Gly Arg Arg Gly Pro Leu Gln Val Ala Phe Thr Ile Lys Glu
225                 230                 235                 240

Leu Arg Glu Met Ile Gln Leu Pro Gly Ala Arg Pro Ile Leu Asp Pro
                245                 250                 255

Val Asp Phe Leu Gly Leu Gln Asp Lys Ile Lys Glu Val Pro Arg Pro
            260                 265                 270

Arg Lys Arg Leu Thr Glu Leu Leu Arg Thr Ala Thr Glu Lys Pro
        275                 280                 285

Gly Pro Ala Glu Ala Ala Arg Gln Ala Ser Ala Ser Arg Ala Trp Gly
    290                 295                 300

Leu Arg Phe Phe Arg Ser Pro Gln Gln Val Leu Pro Ser Pro Asp Gly
305                 310                 315                 320

Arg Arg Ala Ala Gly Val Arg Leu Ala Val Thr Arg Leu Glu Gly Val
                325                 330                 335

Asp Glu Ala Thr Arg Ala Val Pro Thr Gly Asp Met Glu Asp Leu Pro
            340                 345                 350

Cys Gly Leu Val Leu Ser Ser Ile Gly Tyr Lys Ser Arg Pro Val Asp
        355                 360                 365

Pro Ser Val Pro Phe Asp Ser Lys Leu Gly Val Ile Pro Asn Val Glu
    370                 375                 380

Gly Arg Val Met Asp Val Pro Gly Leu Tyr Cys Ser Gly Trp Val Lys
385                 390                 395                 400

Arg Gly Pro Thr Gly Val Ile Ala Thr Thr Met Thr Asp Ser Phe Leu
                405                 410                 415

Thr Gly Gln Met Leu Leu Gln Asp Leu Lys Ala Gly Leu Leu Pro Ser
            420                 425                 430

Gly Pro Arg Pro Gly Tyr Ala Ala Ile Gln Ala Leu Leu Ser Ser Arg
        435                 440                 445

Gly Val Arg Pro Val Ser Phe Ser Asp Trp Glu Lys Leu Asp Ala Glu
    450                 455                 460

Glu Val Ala Arg Gly Gln Gly Thr Gly Lys Pro Arg Glu Lys Leu Val
465                 470                 475                 480

Asp Pro Gln Glu Met Leu Arg Leu Leu Gly His
                485                 490

<210> SEQ ID NO 6
<211> LENGTH: 184

```
<212> TYPE: PRT
<213> ORGANISM: Homo sapiens

<400> SEQUENCE: 6

Met Ala Ala Gly Gly Ala Arg Leu Leu Arg Ala Ala Ser Ala Val
1               5                   10                  15

Leu Gly Gly Pro Ala Gly Arg Trp Leu His His Ala Gly Ser Arg Ala
            20                  25                  30

Gly Ser Ser Gly Leu Leu Arg Asn Arg Gly Pro Gly Gly Ser Ala Glu
        35                  40                  45

Ala Ser Arg Ser Leu Ser Val Ser Ala Arg Ala Arg Ser Ser Ser Glu
    50                  55                  60

Asp Lys Ile Thr Val His Phe Ile Asn Arg Asp Gly Glu Thr Leu Thr
65                  70                  75                  80

Thr Lys Gly Lys Val Gly Asp Ser Leu Leu Asp Val Val Val Glu Asn
                85                  90                  95

Asn Leu Asp Ile Asp Gly Phe Gly Ala Cys Glu Gly Thr Leu Ala Cys
            100                 105                 110

Ser Thr Cys His Leu Ile Phe Glu Asp His Ile Tyr Glu Lys Leu Asp
        115                 120                 125

Ala Ile Thr Asp Glu Glu Asn Asp Met Leu Asp Leu Ala Tyr Gly Leu
    130                 135                 140

Thr Asp Arg Ser Arg Leu Gly Cys Gln Ile Cys Leu Thr Lys Ser Met
145                 150                 155                 160

Asp Asn Met Thr Val Arg Val Pro Glu Thr Val Ala Asp Ala Arg Gln
                165                 170                 175

Ser Ile Asp Val Gly Lys Thr Ser
                180

<210> SEQ ID NO 7
<211> LENGTH: 372
<212> TYPE: PRT
<213> ORGANISM: Homo sapiens

<400> SEQUENCE: 7

Met Gly Trp Ser Cys Leu Val Thr Gly Ala Gly Gly Leu Leu Gly Gln
1               5                   10                  15

Arg Ile Val Arg Leu Leu Val Glu Glu Lys Glu Leu Lys Glu Ile Arg
            20                  25                  30

Ala Leu Asp Lys Ala Phe Arg Pro Glu Leu Arg Glu Glu Phe Ser Lys
        35                  40                  45

Leu Gln Asn Arg Thr Lys Leu Thr Val Leu Glu Gly Asp Ile Leu Asp
    50                  55                  60

Glu Pro Phe Leu Lys Arg Ala Cys Gln Asp Val Ser Val Val Ile His
65                  70                  75                  80

Thr Ala Cys Ile Ile Asp Val Phe Gly Val Thr His Arg Glu Ser Ile
                85                  90                  95

Met Asn Val Asn Val Lys Gly Thr Gln Leu Leu Leu Glu Ala Cys Val
            100                 105                 110

Gln Ala Ser Val Pro Val Phe Ile Tyr Thr Ser Ser Ile Glu Val Ala
        115                 120                 125

Gly Pro Asn Ser Tyr Lys Glu Ile Ile Gln Asn Gly His Glu Glu Glu
    130                 135                 140

Pro Leu Glu Asn Thr Trp Pro Thr Pro Tyr Pro Tyr Ser Lys Lys Leu
145                 150                 155                 160
```

```
Ala Glu Lys Ala Val Leu Ala Ala Asn Gly Trp Asn Leu Lys Asn Gly
            165                 170                 175

Asp Thr Leu Tyr Thr Cys Ala Leu Arg Pro Thr Tyr Ile Tyr Gly Glu
        180                 185                 190

Gly Gly Pro Phe Leu Ser Ala Ser Ile Asn Glu Ala Leu Asn Asn Asn
        195                 200                 205

Gly Ile Leu Ser Ser Val Gly Lys Phe Ser Thr Val Asn Pro Val Tyr
    210                 215                 220

Val Gly Asn Val Ala Trp Ala His Ile Leu Ala Leu Arg Ala Leu Arg
225                 230                 235                 240

Asp Pro Lys Lys Ala Pro Ser Val Arg Gly Gln Phe Tyr Tyr Ile Ser
                245                 250                 255

Asp Asp Thr Pro His Gln Ser Tyr Asp Asn Leu Asn Tyr Ile Leu Ser
            260                 265                 270

Lys Glu Phe Gly Leu Arg Leu Asp Ser Arg Trp Ser Leu Pro Leu Thr
        275                 280                 285

Leu Met Tyr Trp Ile Gly Phe Leu Leu Glu Val Val Ser Phe Leu Leu
    290                 295                 300

Ser Pro Ile Tyr Ser Tyr Gln Pro Pro Phe Asn Arg His Thr Val Thr
305                 310                 315                 320

Leu Ser Asn Ser Val Phe Thr Phe Ser Tyr Lys Lys Ala Gln Arg Asp
                325                 330                 335

Leu Ala Tyr Lys Pro Leu Tyr Ser Trp Glu Glu Ala Lys Gln Lys Thr
            340                 345                 350

Val Glu Trp Val Gly Ser Leu Val Asp Arg His Lys Glu Thr Leu Lys
        355                 360                 365

Ser Lys Thr Gln
    370

<210> SEQ ID NO 8
<211> LENGTH: 390
<212> TYPE: PRT
<213> ORGANISM: Rhodococcus rhodochrous

<400> SEQUENCE: 8

Met Ser Ile Asp Thr Ala Arg Ser Gly Ser Asp Asp Val Glu Ile
1               5                   10                  15

Arg Glu Ile Gln Ala Ala Ala Pro Thr Arg Phe Ala Arg Gly Trp
                20                  25                  30

His Cys Leu Gly Leu Leu Arg Asp Phe Gln Asp Gly Lys Pro His Ser
        35                  40                  45

Ile Glu Ala Phe Gly Thr Lys Leu Val Val Phe Ala Asp Ser Lys Gly
    50                  55                  60

Gln Leu Asn Val Leu Asp Ala Tyr Cys Arg His Met Gly Gly Asp Leu
65                  70                  75                  80

Ser Arg Gly Glu Val Lys Gly Asp Ser Ile Ala Cys Pro Phe His Asp
                85                  90                  95

Trp Arg Trp Asn Gly Lys Gly Lys Cys Thr Asp Ile Pro Tyr Ala Arg
                100                 105                 110

Arg Val Pro Pro Ile Ala Lys Thr Arg Ala Trp Thr Thr Leu Glu Arg
            115                 120                 125

Asn Gly Gln Leu Tyr Val Trp Asn Asp Pro Gln Gly Asn Pro Pro
        130                 135                 140

Glu Asp Val Thr Ile Pro Glu Ile Ala Gly Tyr Gly Thr Asp Glu Trp
145                 150                 155                 160
```

```
Thr Asp Trp Ser Trp Lys Ser Leu Arg Ile Lys Gly Ser His Cys Arg
                165                 170                 175

Glu Ile Val Asp Asn Val Val Asp Met Ala His Phe Phe Tyr Ile His
            180                 185                 190

Tyr Ser Phe Pro Arg Tyr Phe Lys Asn Val Phe Glu Gly His Thr Ala
        195                 200                 205

Thr Gln Tyr Met His Ser Thr Gly Arg Glu Asp Val Ile Ser Gly Thr
    210                 215                 220

Asn Tyr Asp Asp Pro Asn Ala Glu Leu Arg Ser Glu Ala Thr Tyr Phe
225                 230                 235                 240

Gly Pro Ser Tyr Met Ile Asp Trp Leu Glu Ser Asp Ala Asn Gly Gln
                245                 250                 255

Thr Ile Glu Thr Ile Leu Ile Asn Cys His Tyr Pro Val Ser Asn Asn
            260                 265                 270

Glu Phe Val Leu Gln Tyr Gly Ala Ile Val Lys Lys Leu Pro Gly Val
        275                 280                 285

Ser Asp Glu Ile Ala Ala Gly Met Ala Glu Gln Phe Ala Glu Gly Val
    290                 295                 300

Gln Leu Gly Phe Glu Gln Asp Val Glu Ile Trp Lys Asn Lys Ala Pro
305                 310                 315                 320

Ile Asp Asn Pro Leu Leu Ser Glu Glu Asp Gly Pro Val Tyr Gln Leu
                325                 330                 335

Arg Arg Trp Tyr Gln Gln Phe Tyr Val Asp Val Glu Asp Ile Thr Glu
            340                 345                 350

Asp Met Thr Lys Arg Phe Glu Phe Glu Ile Asp Thr Thr Arg Ala Val
        355                 360                 365

Ala Ser Trp Gln Lys Glu Val Ala Glu Asn Leu Ala Lys Gln Ala Glu
    370                 375                 380

Gly Ser Thr Ala Thr Pro
385                 390

<210> SEQ ID NO 9
<211> LENGTH: 350
<212> TYPE: PRT
<213> ORGANISM: Rhodococcus rhodochrous

<400> SEQUENCE: 9

Met Thr Ala Val Gln Ala Pro Val Thr Ser Arg Ala Thr Val Leu Thr
1               5                   10                  15

Val Ser Ala Val Val Gln Glu Thr Ala Asp Ala Val Ser Leu Val Phe
            20                  25                  30

Asp Val Pro Asp Asp Arg Arg Glu Asp Phe Thr Tyr Arg Pro Gly Gln
        35                  40                  45

Phe Leu Thr Leu Arg Ile Pro Ser Asp Arg Thr Gly Ser Val Ala Arg
    50                  55                  60

Cys Tyr Ser Leu Ala Ser Ser Pro Phe Thr Gly Glu Pro Pro Lys Val
65                  70                  75                  80

Thr Val Lys Arg Thr Ala Gly Gly Tyr Gly Ser Asn Trp Leu Cys Asp
                85                  90                  95

Asn Ile Val Ala Gly Arg Ser Ile Glu Val Leu Pro Pro Ala Gly Val
            100                 105                 110

Phe Thr Pro Ala Asp Leu Thr Glu Lys Leu Val Leu Phe Ala Gly Gly
        115                 120                 125

Ser Gly Ile Thr Pro Val Met Ser Ile Leu Glu Ser Ala Leu His Ser
```

-continued

```
                130                 135                 140
Gly Asn Arg Asp Val Val Leu Ile Tyr Gly Asn Arg Asp Glu Lys Ser
145                 150                 155                 160

Val Ile Phe Ala Glu Lys Leu Arg Glu Leu Ala Ala Arg His Ala Gly
                165                 170                 175

Ala Leu Thr Val Val His Trp Leu Glu Ser Val Gln Gly Leu Pro Ser
            180                 185                 190

Pro Gln Gln Leu Ala Thr Leu Ile Ser Pro Phe Ala Asp His Arg Ala
                195                 200                 205

Tyr Met Cys Gly Pro Gly Pro Phe Met Asp Thr Val Arg Glu Gly Leu
            210                 215                 220

Leu Leu Ala Gly Val Pro Lys Asp Arg Ile His Ala Glu Val Phe Thr
225                 230                 235                 240

Ser Leu Ser Gly Asp Pro Phe Ala Asp Val Pro Leu Val Glu Ile Asp
                245                 250                 255

Glu Ser Asp Ala Asp Ala Thr Ser Ala Thr Val Gln Leu Asp Gly Glu
            260                 265                 270

Glu His Asp Leu Val Trp Pro Arg Ser Ala Thr Leu Val Asp Val Met
            275                 280                 285

Leu Ser Lys Gly Leu Asp Val Pro Tyr Ser Cys Arg Glu Gly Glu Cys
290                 295                 300

Gly Ser Cys Ala Cys Thr Val Val Glu Gly Asp Val Asp Ser Leu Pro
305                 310                 315                 320

Ser Ala Ile Leu Asp Glu Glu Asp Ile Ala Asn Gly Tyr Val Leu Ala
                325                 330                 335

Cys Gln Ala Arg Pro Lys Ser Asp His Val Arg Ile Glu Phe
                340                 345                 350

<210> SEQ ID NO 10
<211> LENGTH: 510
<212> TYPE: PRT
<213> ORGANISM: Rhodococcus rhodochrous

<400> SEQUENCE: 10

Met Gln Asp Trp Thr Ser Glu Cys Asp Val Leu Val Val Gly Ser Gly
1               5                   10                  15

Gly Gly Ala Leu Thr Gly Ala Tyr Thr Ala Ala Ala Gln Gly Leu Thr
                20                  25                  30

Thr Ile Val Leu Glu Lys Thr Asp Arg Phe Gly Gly Thr Ser Ala Tyr
            35                  40                  45

Ser Gly Ala Ser Ile Trp Leu Pro Gly Thr Gln Val Gln Glu Arg Ala
50                  55                  60

Gly Leu Pro Asp Ser Thr Glu Asn Ala Arg Thr Tyr Leu Arg Ala Leu
65                  70                  75                  80

Leu Gly Asp Ala Glu Ser Glu Arg Gln Asp Ala Tyr Val Glu Thr Ala
                85                  90                  95

Pro Ala Val Val Ala Leu Leu Glu Gln Asn Pro Asn Ile Glu Phe Glu
                100                 105                 110

Phe Arg Ala Phe Pro Asp Tyr Tyr Lys Ala Glu Gly Arg Met Asp Thr
            115                 120                 125

Gly Arg Ser Ile Asn Pro Leu Asp Leu Asp Pro Ala Asp Ile Gly Asp
        130                 135                 140

Leu Ala Gly Lys Val Arg Pro Glu Leu Asp Gln Asp Arg Thr Gly Gln
145                 150                 155                 160
```

```
Asp His Ala Pro Gly Pro Met Ile Gly Gly Arg Ala Leu Ile Gly Arg
            165                 170                 175

Leu Leu Ala Ala Val Gln Ser Thr Gly Lys Ala Glu Leu Arg Thr Glu
        180                 185                 190

Ser Val Leu Thr Ser Leu Ile Val Glu Asp Gly Arg Val Val Gly Ala
    195                 200                 205

Glu Val Glu Ser Gly Gly Glu Thr Gln Arg Ile Lys Ala Asn Arg Gly
210                 215                 220

Val Leu Met Ala Ala Gly Gly Ile Glu Gly Asn Ala Glu Met Arg Glu
225                 230                 235                 240

Gln Ala Gly Thr Pro Gly Lys Ala Ile Trp Ser Met Gly Pro Phe Gly
                245                 250                 255

Ala Asn Thr Gly Asp Ala Ile Ser Ala Gly Ile Ala Val Gly Gly Ala
            260                 265                 270

Thr Ala Leu Leu Asp Gln Ala Trp Phe Cys Pro Gly Val Glu Gln Pro
        275                 280                 285

Asp Gly Ser Ala Ala Phe Met Val Gly Val Arg Gly Gly Leu Val Val
    290                 295                 300

Asp Ser Ala Gly Glu Arg Tyr Leu Asn Glu Ser Leu Pro Tyr Asp Gln
305                 310                 315                 320

Phe Gly Arg Ala Met Asp Ala His Asp Asn Gly Ser Ala Val Pro
                325                 330                 335

Ser Phe Met Ile Phe Asp Ser Arg Glu Gly Gly Leu Pro Ala Ile
            340                 345                 350

Cys Ile Pro Asn Thr Ala Pro Ala Lys His Leu Glu Ala Gly Thr Trp
        355                 360                 365

Val Gly Ala Asp Thr Leu Glu Glu Leu Ala Ala Lys Thr Gly Leu Pro
    370                 375                 380

Ala Asp Ala Leu Arg Ser Thr Val Glu Lys Phe Asn Asp Ala Ala Lys
385                 390                 395                 400

Leu Gly Val Asp Glu Glu Phe His Arg Gly Asp Pro Tyr Asp Ala
                405                 410                 415

Phe Phe Cys Pro Pro Asn Gly Gly Ala Asn Ala Ala Leu Thr Ala Ile
            420                 425                 430

Glu Asn Gly Pro Phe Tyr Ala Ala Arg Ile Val Leu Ser Asp Leu Gly
        435                 440                 445

Thr Lys Gly Gly Leu Val Thr Asp Val Asn Gly Arg Val Leu Arg Ala
    450                 455                 460

Asp Gly Ser Ala Ile Asp Gly Leu Tyr Ala Ala Gly Asn Thr Ser Ala
465                 470                 475                 480

Ser Leu Ser Gly Arg Phe Tyr Pro Gly Pro Gly Val Pro Leu Gly Thr
                485                 490                 495

Ala Met Val Phe Ser Tyr Arg Ala Ala Gln Asp Met Ala Lys
            500                 505                 510

<210> SEQ ID NO 11
<211> LENGTH: 2261
<212> TYPE: PRT
<213> ORGANISM: Homo sapiens

<400> SEQUENCE: 11

Met Ala Cys Trp Pro Gln Leu Arg Leu Leu Leu Trp Lys Asn Leu Thr
1               5                   10                  15

Phe Arg Arg Arg Gln Thr Cys Gln Leu Leu Leu Glu Val Ala Trp Pro
            20                  25                  30
```

```
Leu Phe Ile Phe Leu Ile Leu Ile Ser Val Arg Leu Ser Tyr Pro Pro
         35                  40                  45

Tyr Glu Gln His Glu Cys His Phe Pro Asn Lys Ala Met Pro Ser Ala
     50                  55                  60

Gly Thr Leu Pro Trp Val Gln Gly Ile Ile Cys Asn Ala Asn Asn Pro
 65                  70                  75                  80

Cys Phe Arg Tyr Pro Thr Pro Gly Glu Ala Pro Gly Val Val Gly Asn
                 85                  90                  95

Phe Asn Lys Ser Ile Val Ala Arg Leu Phe Ser Asp Ala Arg Arg Leu
                100                 105                 110

Leu Leu Tyr Ser Gln Lys Asp Thr Ser Met Lys Asp Met Arg Lys Val
            115                 120                 125

Leu Arg Thr Leu Gln Gln Ile Lys Lys Ser Ser Asn Leu Lys Leu
        130                 135                 140

Gln Asp Phe Leu Val Asp Asn Glu Thr Phe Ser Gly Phe Leu Tyr His
145                 150                 155                 160

Asn Leu Ser Leu Pro Lys Ser Thr Val Asp Lys Met Leu Arg Ala Asp
                165                 170                 175

Val Ile Leu His Lys Val Phe Leu Gln Gly Tyr Gln Leu His Leu Thr
            180                 185                 190

Ser Leu Cys Asn Gly Ser Lys Ser Glu Glu Met Ile Gln Leu Gly Asp
        195                 200                 205

Gln Glu Val Ser Glu Leu Cys Gly Leu Pro Arg Glu Lys Leu Ala Ala
210                 215                 220

Ala Glu Arg Val Leu Arg Ser Asn Met Asp Ile Leu Lys Pro Ile Leu
225                 230                 235                 240

Arg Thr Leu Asn Ser Thr Ser Pro Phe Pro Ser Lys Glu Leu Ala Glu
                245                 250                 255

Ala Thr Lys Thr Leu Leu His Ser Leu Gly Thr Leu Ala Gln Glu Leu
            260                 265                 270

Phe Ser Met Arg Ser Trp Ser Asp Met Arg Gln Glu Val Met Phe Leu
        275                 280                 285

Thr Asn Val Asn Ser Ser Ser Ser Thr Gln Ile Tyr Gln Ala Val
290                 295                 300

Ser Arg Ile Val Cys Gly His Pro Glu Gly Gly Leu Lys Ile Lys
305                 310                 315                 320

Ser Leu Asn Trp Tyr Glu Asp Asn Asn Tyr Lys Ala Leu Phe Gly Gly
                325                 330                 335

Asn Gly Thr Glu Glu Asp Ala Glu Thr Phe Tyr Asp Asn Ser Thr Thr
            340                 345                 350

Pro Tyr Cys Asn Asp Leu Met Lys Asn Leu Glu Ser Ser Pro Leu Ser
        355                 360                 365

Arg Ile Ile Trp Lys Ala Leu Lys Pro Leu Leu Val Gly Lys Ile Leu
        370                 375                 380

Tyr Thr Pro Asp Thr Pro Ala Thr Arg Gln Val Met Ala Glu Val Asn
385                 390                 395                 400

Lys Thr Phe Gln Glu Leu Ala Val Phe His Asp Leu Glu Gly Met Trp
                405                 410                 415

Glu Glu Leu Ser Pro Lys Ile Trp Thr Phe Met Glu Asn Ser Gln Glu
            420                 425                 430

Met Asp Leu Val Arg Met Leu Leu Asp Ser Arg Asp Asn Asp His Phe
        435                 440                 445
```

```
Trp Glu Gln Gln Leu Asp Gly Leu Asp Trp Thr Ala Gln Asp Ile Val
    450                 455                 460

Ala Phe Leu Ala Lys His Pro Glu Asp Val Gln Ser Ser Asn Gly Ser
465                 470                 475                 480

Val Tyr Thr Trp Arg Glu Ala Phe Asn Glu Thr Asn Gln Ala Ile Arg
                485                 490                 495

Thr Ile Ser Arg Phe Met Glu Cys Val Asn Leu Asn Lys Leu Glu Pro
            500                 505                 510

Ile Ala Thr Glu Val Trp Leu Ile Asn Lys Ser Met Glu Leu Leu Asp
                515                 520                 525

Glu Arg Lys Phe Trp Ala Gly Ile Val Phe Thr Gly Ile Thr Pro Gly
530                 535                 540

Ser Ile Glu Leu Pro His His Val Lys Tyr Lys Ile Arg Met Asp Ile
545                 550                 555                 560

Asp Asn Val Glu Arg Thr Asn Lys Ile Lys Asp Gly Tyr Trp Asp Pro
                565                 570                 575

Gly Pro Arg Ala Asp Pro Phe Glu Asp Met Arg Tyr Val Trp Gly Gly
            580                 585                 590

Phe Ala Tyr Leu Gln Asp Val Val Glu Gln Ala Ile Ile Arg Val Leu
            595                 600                 605

Thr Gly Thr Glu Lys Lys Thr Gly Val Tyr Met Gln Gln Met Pro Tyr
            610                 615                 620

Pro Cys Tyr Val Asp Asp Ile Phe Leu Arg Val Met Ser Arg Ser Met
625                 630                 635                 640

Pro Leu Phe Met Thr Leu Ala Trp Ile Tyr Ser Val Ala Val Ile Ile
                645                 650                 655

Lys Gly Ile Val Tyr Glu Lys Glu Ala Arg Leu Lys Glu Thr Met Arg
                660                 665                 670

Ile Met Gly Leu Asp Asn Ser Ile Leu Trp Phe Ser Trp Phe Ile Ser
            675                 680                 685

Ser Leu Ile Pro Leu Leu Val Ser Ala Gly Leu Leu Val Val Ile Leu
690                 695                 700

Lys Leu Gly Asn Leu Leu Pro Tyr Ser Asp Pro Ser Val Val Phe Val
705                 710                 715                 720

Phe Leu Ser Val Phe Ala Val Val Thr Ile Leu Gln Cys Phe Leu Ile
                725                 730                 735

Ser Thr Leu Phe Ser Arg Ala Asn Leu Ala Ala Ala Cys Gly Gly Ile
                740                 745                 750

Ile Tyr Phe Thr Leu Tyr Leu Pro Tyr Val Leu Cys Val Ala Trp Gln
            755                 760                 765

Asp Tyr Val Gly Phe Thr Leu Lys Ile Phe Ala Ser Leu Leu Ser Pro
    770                 775                 780

Val Ala Phe Gly Phe Gly Cys Glu Tyr Phe Ala Leu Phe Glu Glu Gln
785                 790                 795                 800

Gly Ile Gly Val Gln Trp Asp Asn Leu Phe Glu Ser Pro Val Glu Glu
                805                 810                 815

Asp Gly Phe Asn Leu Thr Thr Ser Val Ser Met Met Leu Phe Asp Thr
                820                 825                 830

Phe Leu Tyr Gly Val Met Thr Trp Tyr Ile Glu Ala Val Phe Pro Gly
            835                 840                 845

Gln Tyr Gly Ile Pro Arg Pro Trp Tyr Phe Pro Cys Thr Lys Ser Tyr
    850                 855                 860

Trp Phe Gly Glu Glu Ser Asp Glu Lys Ser His Pro Gly Ser Asn Gln
```

-continued

```
                865                 870                 875                 880
Lys Arg Ile Ser Glu Ile Cys Met Glu Glu Pro Thr His Leu Lys
                    885                 890                 895
Leu Gly Val Ser Ile Gln Asn Leu Val Lys Val Tyr Arg Asp Gly Met
                    900                 905                 910
Lys Val Ala Val Asp Gly Leu Ala Leu Asn Phe Tyr Glu Gly Gln Ile
                    915                 920                 925
Thr Ser Phe Leu Gly His Asn Gly Ala Gly Lys Thr Thr Thr Met Ser
                    930                 935                 940
Ile Leu Thr Gly Leu Phe Pro Pro Thr Ser Gly Thr Ala Tyr Ile Leu
945                 950                 955                 960
Gly Lys Asp Ile Arg Ser Glu Met Ser Thr Ile Arg Gln Asn Leu Gly
                    965                 970                 975
Val Cys Pro Gln His Asn Val Leu Phe Asp Met Leu Thr Val Glu Glu
                    980                 985                 990
His Ile Trp Phe Tyr Ala Arg Leu Lys Gly Leu Ser Glu Lys His Val
                    995                 1000                1005
Lys Ala Glu Met Glu Gln Met Ala Leu Asp Val Gly Leu Pro Ser
            1010                1015                1020
Ser Lys Leu Lys Ser Lys Thr Ser Gln Leu Ser Gly Gly Met Gln
            1025                1030                1035
Arg Lys Leu Ser Val Ala Leu Ala Phe Val Gly Gly Ser Lys Val
            1040                1045                1050
Val Ile Leu Asp Glu Pro Thr Ala Gly Val Asp Pro Tyr Ser Arg
            1055                1060                1065
Arg Gly Ile Trp Glu Leu Leu Leu Lys Tyr Arg Gln Gly Arg Thr
            1070                1075                1080
Ile Ile Leu Ser Thr His His Met Asp Glu Ala Asp Val Leu Gly
            1085                1090                1095
Asp Arg Ile Ala Ile Ile Ser His Gly Lys Leu Cys Cys Val Gly
            1100                1105                1110
Ser Ser Leu Phe Leu Lys Asn Gln Leu Gly Thr Gly Tyr Tyr Leu
            1115                1120                1125
Thr Leu Val Lys Lys Asp Val Glu Ser Ser Leu Ser Ser Cys Arg
            1130                1135                1140
Asn Ser Ser Ser Thr Val Ser Tyr Leu Lys Lys Glu Asp Ser Val
            1145                1150                1155
Ser Gln Ser Ser Ser Asp Ala Gly Leu Gly Ser Asp His Glu Ser
            1160                1165                1170
Asp Thr Leu Thr Ile Asp Val Ser Ala Ile Ser Asn Leu Ile Arg
            1175                1180                1185
Lys His Val Ser Glu Ala Arg Leu Val Glu Asp Ile Gly His Glu
            1190                1195                1200
Leu Thr Tyr Val Leu Pro Tyr Glu Ala Ala Lys Glu Gly Ala Phe
            1205                1210                1215
Val Glu Leu Phe His Glu Ile Asp Asp Arg Leu Ser Asp Leu Gly
            1220                1225                1230
Ile Ser Ser Tyr Gly Ile Ser Glu Thr Thr Leu Glu Glu Ile Phe
            1235                1240                1245
Leu Lys Val Ala Glu Glu Ser Gly Val Asp Ala Glu Thr Ser Asp
            1250                1255                1260
Gly Thr Leu Pro Ala Arg Arg Asn Arg Arg Ala Phe Gly Asp Lys
            1265                1270                1275
```

```
Gln Ser Cys Leu Arg Pro Phe Thr Glu Asp Asp Ala Ala Asp Pro
    1280            1285                1290

Asn Asp Ser Asp Ile Asp Pro Glu Ser Arg Glu Thr Asp Leu Leu
    1295            1300                1305

Ser Gly Met Asp Gly Lys Gly Ser Tyr Gln Val Lys Gly Trp Lys
    1310            1315                1320

Leu Thr Gln Gln Gln Phe Val Ala Leu Leu Trp Lys Arg Leu Leu
    1325            1330                1335

Ile Ala Arg Arg Ser Arg Lys Gly Phe Phe Ala Gln Ile Val Leu
    1340            1345                1350

Pro Ala Val Phe Val Cys Ile Ala Leu Val Phe Ser Leu Ile Val
    1355            1360                1365

Pro Pro Phe Gly Lys Tyr Pro Ser Leu Glu Leu Gln Pro Trp Met
    1370            1375                1380

Tyr Asn Glu Gln Tyr Thr Phe Val Ser Asn Asp Ala Pro Glu Asp
    1385            1390                1395

Thr Gly Thr Leu Glu Leu Leu Asn Ala Leu Thr Lys Asp Pro Gly
    1400            1405                1410

Phe Gly Thr Arg Cys Met Glu Gly Asn Pro Ile Pro Asp Thr Pro
    1415            1420                1425

Cys Gln Ala Gly Glu Glu Glu Trp Thr Thr Ala Pro Val Pro Gln
    1430            1435                1440

Thr Ile Met Asp Leu Phe Gln Asn Gly Asn Trp Thr Met Gln Asn
    1445            1450                1455

Pro Ser Pro Ala Cys Gln Cys Ser Ser Asp Lys Ile Lys Lys Met
    1460            1465                1470

Leu Pro Val Cys Pro Pro Gly Ala Gly Gly Leu Pro Pro Pro Gln
    1475            1480                1485

Arg Lys Gln Asn Thr Ala Asp Ile Leu Gln Asp Leu Thr Gly Arg
    1490            1495                1500

Asn Ile Ser Asp Tyr Leu Val Lys Thr Tyr Val Gln Ile Ile Ala
    1505            1510                1515

Lys Ser Leu Lys Asn Lys Ile Trp Val Asn Glu Phe Arg Tyr Gly
    1520            1525                1530

Gly Phe Ser Leu Gly Val Ser Asn Thr Gln Ala Leu Pro Pro Ser
    1535            1540                1545

Gln Glu Val Asn Asp Ala Ile Lys Gln Met Lys Lys His Leu Lys
    1550            1555                1560

Leu Ala Lys Asp Ser Ser Ala Asp Arg Phe Leu Asn Ser Leu Gly
    1565            1570                1575

Arg Phe Met Thr Gly Leu Asp Thr Lys Asn Asn Val Lys Val Trp
    1580            1585                1590

Phe Asn Asn Lys Gly Trp His Ala Ile Ser Ser Phe Leu Asn Val
    1595            1600                1605

Ile Asn Asn Ala Ile Leu Arg Ala Asn Leu Gln Lys Gly Glu Asn
    1610            1615                1620

Pro Ser His Tyr Gly Ile Thr Ala Phe Asn His Pro Leu Asn Leu
    1625            1630                1635

Thr Lys Gln Gln Leu Ser Glu Val Ala Leu Met Thr Thr Ser Val
    1640            1645                1650

Asp Val Leu Val Ser Ile Cys Val Ile Phe Ala Met Ser Phe Val
    1655            1660                1665
```

```
Pro Ala Ser Phe Val Val Phe Leu Ile Gln Glu Arg Val Ser Lys
1670                1675                1680

Ala Lys His Leu Gln Phe Ile Ser Gly Val Lys Pro Val Ile Tyr
1685                1690                1695

Trp Leu Ser Asn Phe Val Trp Asp Met Cys Asn Tyr Val Val Pro
1700                1705                1710

Ala Thr Leu Val Ile Ile Ile Phe Ile Cys Phe Gln Gln Lys Ser
1715                1720                1725

Tyr Val Ser Ser Thr Asn Leu Pro Val Leu Ala Leu Leu Leu Leu
1730                1735                1740

Leu Tyr Gly Trp Ser Ile Thr Pro Leu Met Tyr Pro Ala Ser Phe
1745                1750                1755

Val Phe Lys Ile Pro Ser Thr Ala Tyr Val Val Leu Thr Ser Val
1760                1765                1770

Asn Leu Phe Ile Gly Ile Asn Gly Ser Val Ala Thr Phe Val Leu
1775                1780                1785

Glu Leu Phe Thr Asp Asn Lys Leu Asn Asn Ile Asn Asp Ile Leu
1790                1795                1800

Lys Ser Val Phe Leu Ile Phe Pro His Phe Cys Leu Gly Arg Gly
1805                1810                1815

Leu Ile Asp Met Val Lys Asn Gln Ala Met Ala Asp Ala Leu Glu
1820                1825                1830

Arg Phe Gly Glu Asn Arg Phe Val Ser Pro Leu Ser Trp Asp Leu
1835                1840                1845

Val Gly Arg Asn Leu Phe Ala Met Ala Val Glu Gly Val Val Phe
1850                1855                1860

Phe Leu Ile Thr Val Leu Ile Gln Tyr Arg Phe Phe Ile Arg Pro
1865                1870                1875

Arg Pro Val Asn Ala Lys Leu Ser Pro Leu Asn Asp Glu Asp Glu
1880                1885                1890

Asp Val Arg Arg Glu Arg Gln Arg Ile Leu Asp Gly Gly Gly Gln
1895                1900                1905

Asn Asp Ile Leu Glu Ile Lys Glu Leu Thr Lys Ile Tyr Arg Arg
1910                1915                1920

Lys Arg Lys Pro Ala Val Asp Arg Ile Cys Val Gly Ile Pro Pro
1925                1930                1935

Gly Glu Cys Phe Gly Leu Leu Gly Val Asn Gly Ala Gly Lys Ser
1940                1945                1950

Ser Thr Phe Lys Met Leu Thr Gly Asp Thr Thr Val Thr Arg Gly
1955                1960                1965

Asp Ala Phe Leu Asn Lys Asn Ser Ile Leu Ser Asn Ile His Glu
1970                1975                1980

Val His Gln Asn Met Gly Tyr Cys Pro Gln Phe Asp Ala Ile Thr
1985                1990                1995

Glu Leu Leu Thr Gly Arg Glu His Val Glu Phe Phe Ala Leu Leu
2000                2005                2010

Arg Gly Val Pro Glu Lys Glu Val Gly Lys Val Gly Glu Trp Ala
2015                2020                2025

Ile Arg Lys Leu Gly Leu Val Lys Tyr Gly Glu Lys Tyr Ala Gly
2030                2035                2040

Asn Tyr Ser Gly Gly Asn Lys Arg Lys Leu Ser Thr Ala Met Ala
2045                2050                2055

Leu Ile Gly Gly Pro Pro Val Val Phe Leu Asp Glu Pro Thr Thr
```

```
                    2060                2065                2070
Gly Met Asp Pro Lys Ala Arg Arg Phe Leu Trp Asn Cys Ala Leu
        2075                2080                2085

Ser Val Val Lys Glu Gly Arg Ser Val Val Leu Thr Ser His Ser
    2090                2095                2100

Met Glu Glu Cys Glu Ala Leu Cys Thr Arg Met Ala Ile Met Val
    2105                2110                2115

Asn Gly Arg Phe Arg Cys Leu Gly Ser Val Gln His Leu Lys Asn
    2120                2125                2130

Arg Phe Gly Asp Gly Tyr Thr Ile Val Val Arg Ile Ala Gly Ser
    2135                2140                2145

Asn Pro Asp Leu Lys Pro Val Gln Asp Phe Phe Gly Leu Ala Phe
    2150                2155                2160

Pro Gly Ser Val Leu Lys Glu Lys His Arg Asn Met Leu Gln Tyr
    2165                2170                2175

Gln Leu Pro Ser Ser Leu Ser Leu Ala Arg Ile Phe Ser Ile
    2180                2185                2190

Leu Ser Gln Ser Lys Lys Arg Leu His Ile Glu Asp Tyr Ser Val
    2195                2200                2205

Ser Gln Thr Thr Leu Asp Gln Val Phe Val Asn Phe Ala Lys Asp
    2210                2215                2220

Gln Ser Asp Asp His Leu Lys Asp Leu Ser Leu His Lys Asn
    2225                2230                2235

Gln Thr Val Val Asp Val Ala Val Leu Thr Ser Phe Leu Gln Asp
    2240                2245                2250

Glu Lys Val Lys Glu Ser Tyr Val
    2255                2260

<210> SEQ ID NO 12
<211> LENGTH: 655
<212> TYPE: PRT
<213> ORGANISM: Homo sapiens

<400> SEQUENCE: 12

Met Ser Ser Ser Asn Val Glu Val Phe Ile Pro Val Ser Gln Gly Asn
1               5                   10                  15

Thr Asn Gly Phe Pro Ala Thr Ala Ser Asn Asp Leu Lys Ala Phe Thr
            20                  25                  30

Glu Gly Ala Val Leu Ser Phe His Asn Ile Cys Tyr Arg Val Lys Leu
        35                  40                  45

Lys Ser Gly Phe Leu Pro Cys Arg Lys Pro Val Glu Lys Glu Ile Leu
    50                  55                  60

Ser Asn Ile Asn Gly Ile Met Lys Pro Gly Leu Asn Ala Ile Leu Gly
65                  70                  75                  80

Pro Thr Gly Gly Gly Lys Ser Ser Leu Leu Asp Val Leu Ala Ala Arg
                85                  90                  95

Lys Asp Pro Ser Gly Leu Ser Gly Asp Val Leu Ile Asn Gly Ala Pro
            100                 105                 110

Arg Pro Ala Asn Phe Lys Cys Asn Ser Gly Tyr Val Val Gln Asp Asp
        115                 120                 125

Val Val Met Gly Thr Leu Thr Val Arg Glu Asn Leu Gln Phe Ser Ala
    130                 135                 140

Ala Leu Arg Leu Ala Thr Thr Met Thr Asn His Glu Lys Asn Glu Arg
145                 150                 155                 160
```

-continued

```
Ile Asn Arg Val Ile Gln Glu Leu Gly Leu Asp Lys Val Ala Asp Ser
            165                 170                 175

Lys Val Gly Thr Gln Phe Ile Arg Gly Val Ser Gly Gly Glu Arg Lys
            180                 185                 190

Arg Thr Ser Ile Gly Met Glu Leu Ile Thr Asp Pro Ser Ile Leu Phe
            195                 200                 205

Leu Asp Glu Pro Thr Thr Gly Leu Asp Ser Ser Thr Ala Asn Ala Val
            210                 215                 220

Leu Leu Leu Leu Lys Arg Met Ser Lys Gln Gly Arg Thr Ile Ile Phe
225                 230                 235                 240

Ser Ile His Gln Pro Arg Tyr Ser Ile Phe Lys Leu Phe Asp Ser Leu
            245                 250                 255

Thr Leu Leu Ala Ser Gly Arg Leu Met Phe His Gly Pro Ala Gln Glu
            260                 265                 270

Ala Leu Gly Tyr Phe Glu Ser Ala Gly Tyr His Cys Glu Ala Tyr Asn
            275                 280                 285

Asn Pro Ala Asp Phe Phe Leu Asp Ile Ile Asn Gly Asp Ser Thr Ala
            290                 295                 300

Val Ala Leu Asn Arg Glu Glu Asp Phe Lys Ala Thr Glu Ile Ile Glu
305                 310                 315                 320

Pro Ser Lys Gln Asp Lys Pro Leu Ile Glu Lys Leu Ala Glu Ile Tyr
            325                 330                 335

Val Asn Ser Ser Phe Tyr Lys Glu Thr Lys Ala Glu Leu His Gln Leu
            340                 345                 350

Ser Gly Gly Glu Lys Lys Lys Ile Thr Val Phe Lys Glu Ile Ser
            355                 360                 365

Tyr Thr Thr Ser Phe Cys His Gln Leu Arg Trp Val Ser Lys Arg Ser
370                 375                 380

Phe Lys Asn Leu Leu Gly Asn Pro Gln Ala Ser Ile Ala Gln Ile Ile
385                 390                 395                 400

Val Thr Val Val Leu Gly Leu Val Ile Gly Ala Ile Tyr Phe Gly Leu
            405                 410                 415

Lys Asn Asp Ser Thr Gly Ile Gln Asn Arg Ala Gly Val Leu Phe Phe
            420                 425                 430

Leu Thr Thr Asn Gln Cys Phe Ser Ser Val Ser Ala Val Glu Leu Phe
            435                 440                 445

Val Val Glu Lys Lys Leu Phe Ile His Glu Tyr Ile Ser Gly Tyr Tyr
450                 455                 460

Arg Val Ser Ser Tyr Phe Leu Gly Lys Leu Leu Ser Asp Leu Leu Pro
465                 470                 475                 480

Met Arg Met Leu Pro Ser Ile Ile Phe Thr Cys Ile Val Tyr Phe Met
            485                 490                 495

Leu Gly Leu Lys Pro Lys Ala Asp Ala Phe Phe Val Met Met Phe Thr
            500                 505                 510

Leu Met Met Val Ala Tyr Ser Ala Ser Ser Met Ala Leu Ala Ile Ala
            515                 520                 525

Ala Gly Gln Ser Val Val Ser Val Ala Thr Leu Leu Met Thr Ile Cys
            530                 535                 540

Phe Val Phe Met Met Ile Phe Ser Gly Leu Leu Val Asn Leu Thr Thr
545                 550                 555                 560

Ile Ala Ser Trp Leu Ser Trp Leu Gln Tyr Phe Ser Ile Pro Arg Tyr
            565                 570                 575

Gly Phe Thr Ala Leu Gln His Asn Glu Phe Leu Gly Gln Asn Phe Cys
```

```
                580             585             590
Pro Gly Leu Asn Ala Thr Gly Asn Asn Pro Cys Asn Tyr Ala Thr Cys
            595                 600                 605

Thr Gly Glu Glu Tyr Leu Val Lys Gln Gly Ile Asp Leu Ser Pro Trp
        610                 615                 620

Gly Leu Trp Lys Asn His Val Ala Leu Ala Cys Met Ile Val Ile Phe
625                 630                 635                 640

Leu Thr Ile Ala Tyr Leu Lys Leu Leu Phe Leu Lys Lys Tyr Ser
                645                 650                 655

<210> SEQ ID NO 13
<211> LENGTH: 11414
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 13
ccagcttgga gcgaacgacc tacaccgaac tgagatacct acagcgtgag ctatgagaaa      60
gcgccacgct tcccgaaggg agaaaggcgg acaggtatcc ggtaagcggc agggtcggaa     120
caggagagcg cacgagggag cttccagggg gaaacgcctg gtatctttat agtcctgtcg     180
ggtttcgcca cctctgactt gagcgtcgat ttttgtgatg ctcgtcaggg gggcggagcc     240
tatggaaaaa cgccagcaac gcggcctttt tacggttcct ggccttttgc tggccttttg     300
ctcacatgtc tttcctgcgt tatccctga ttctgtggat aaccgtatta ccgcctttga     360
gtgagctgat accgctcgcc gcagccgaac gaccgagcgc agcgagtcag tgagcgagga     420
agcggaagag cgcccaatac gcaaaccgcc tctccccgcg cgttggccga ttcattaatg     480
cagctggcac gacaggtttc ccgactggaa agcgggcagt gagcgcaacg caattaatac     540
gcgtaccgct agccaggaag agtttgtaga acgcaaaaaa ggccatccgt caggatggcc     600
ttctgcttag tttgatgcct ggcagtttat ggcgggcgtc ctgcccgcca ccctccgggc     660
cgttgcttca caacgttcaa atccgctccc ggcggatttg tcctactcag gagagcgttc     720
accgacaaac aacagataaa acgaaaggcc cagtcttccg actgagcctt tcgtttatt    780 tgatgcctgg cagttcccta ctctcgcgtt aacgctagca tggatgtttt cccagtcacg     840
acgttgtaaa acgacggcca gtcttaagct cgggccccaa ataatgattt tattttgact     900
gatagtgacc tgttcgttgc aacaaattga tgagcaatgc ttttttataa tgccaacttt     960
gtacaaaaaa gcaggcttcg aattcagatc tagaagtact ggcaccatgc tggccaaggg    1020
cctgcctcct agaagcgtgc tcgtgaaggg ctgccagacc ttcctgagcg ccctagaga    1080 aggcctgggc agactgagag tgcctacagg cgaaggcgcc ggaatcagca ccagaagccc    1140 cagaccttc aacagagatcc ccagccctgg cgacaacggc tggctgaacc tgtaccactt    1200
ctggcgggaa accggcaccc acaaagtgca tctgcaccac gtgcagaact ccagaagta    1260 cggcccatc taccgcgaga agctgggcaa cgtggaaagc gtgtacgtga tcgaccccga    1320
ggacgtggcc ctgctgttta agagcgaggg ccccaacccc gagcggttcc tgattcctcc    1380
ttgggtggcc taccaccagt actaccagag gcccatcggc gtgctgctga agaagtccgc    1440
cgcctggaag aaagaccggg tggccctgaa ccaggaagtg atggcccctg aggccaccaa    1500
gaactttctg cccctgctgg acgccgtgtc cagagacttt gtgtccgtgc tgcaccggcg    1560
gatcaagaag gccggcagcg gcaattacag cggcgacatc agcgacgacc tgttcagatt    1620
```

```
cgccttcgag agcatcacca acgtgatctt cggcgagcgg cagggcatgc tggaagaggt    1680
cgtgaatccc gaggcccagc ggttcatcga cgccatctac cagatgttcc acaccagcgt    1740
gcccatgctg aatctgcccc ccgacctgtt tcggctgttc cggaccaaga cctggaagga    1800
ccatgtggcc gcctgggatg tgatcttcag caaggccgac atctacaccc agaacttcta    1860
ctgggagctg cggcagaaag cagcgtgca ccacgactac cggggcatcc tgtacagact    1920
```

-continued

```
tacagatggc gccagcagca gctccgagga taagatcacc gtgcacttca tcaaccggga      4020
cggcgagaca ctgaccacca agggcaaagt gggcgactct ctgctggacg tggtggtgga      4080
aaacaacctg gacatcgacg gcttcggcgc ctgcgaggga cactggcct gtagcacctg       4140 tcacctgatc ttcgaggatc acatctacga aaagctggac gccatcaccg acgaagagaa      4200
cgacatgctg gacctggcct acggcctgac cgatagaagc agactgggct gtcagatctg      4260
cctgaccaag agcatggaca catgaccgt gcgggtgccc gagacagtgg ccgatgccag       4320
acagtccatc gatgtgggca agaccagcga ctacaaggac gacgacgaca agggctccgg      4380
cgccaccaat ttcagcctgc tgaagcaggc aggcgacgtg aagagaacc ccggaccta       4440 gggctggtcc tgcctcgtga caggcgctgg cgggctgctg gggcagagaa ttgtgcggct      4500
gctggtggaa gaaaaagagc tgaaagagat ccgcgccctg acaaggcct tcagacccga      4560 gctgcgggaa gagttcagca gctgcagaa caggaccaag ctgaccgtgc tggaagggga      4620
tatcctggac gagcccttcc tgaagagggc ctgccaggat gtgtccgtcg tgatccacac      4680
cgcctgcatc atcgacgtgt tcggcgtgac ccaccgcgag agcatcatga atgtgaacgt      4740
gaagggcacc cagctgctgc tggaagcctg tgtgcaggcc agcgtgcccg tgttcatcta      4800
caccagcagc atcgaggtgg ccggaccaa cagctacaaa gagatcatcc agaacggcca      4860
cgaggaagaa cccctggaaa cacctggcc cacccctac ccctacagca gaagctggc       4920 cgagaaagcc gtgctggccg ccaacggctg gaacctgaag aacggcgaca ccctgtacac      4980
ctgtgccctg cggcccacct acatctatgg cgagggcgga cctttcctga cgccagcat      5040 caacgaggcc ctgaacaaca cggcatcct gagcagcgtg ggcaagttca gcaccgtgaa      5100
ccccgtgtac gtgggcaatg tggcctgggc ccacattctg gctctgagag ccctgcggga      5160
ccccaagaaa gctccttctg tgcggggcca gttctactac atcagcgacg acacccccca      5220
ccagagctac gacaacctga actacatcct gtccaaagag ttcggcctgc ggctggacag      5280
cagatggtcc ctgcctctga ccctgatgta ctggatcggc ttcctgctgg aagtggtgtc      5340
cttcctgctg agccccatct acagctacca gcccccttc aacggcaca ccgtgaccct      5400 gagcaacagc gtgttcacct tcagctacaa gaaggcccag cgggacctgg cctacaagcc      5460
cctgtactct tgggaggaag ccaagcagaa accgtggaa tgggtgggaa gcctggtgga      5520
ccggcacaaa gagacactga agtccaagac ccagggcagc ggcgagggca gaggatctct      5580
gctgacatgc ggcgacgtgg aagagaaccc tggccccatg gccccatata gcctcctggt      5640
gaccagactg cagaaagccc tgggcgtgcg gcagtaccat gtggcctctg tgctgtgcca      5700
gagggccaag gtggccatga gcgactacaa ggacgacgac gacaaggcg gcggaggcag      5760 catgagcatc gacacagcca gaagcggcag cgacgacgat gtggaaatca gagagatcca      5820
ggccgctgcc gcccctacca gatttgccag aggatggcac tgcctgggcc tgctgagaga      5880
cttccaggac ggcaagcccc acagcatcga ggcctttggc accaagctgg tggtgttcgc      5940
cgacagcaag ggccagctga acgtgctgga cgcctactgc agacacatgg gcggcgatct      6000
gagcagaggc gaagtgaagg gcgactctat cgcctgcccc ttccacgact ggcggtggaa      6060
tggcaagggc aagtgcaccg acatcccctta cgccagacgg gtgccccta tcgccaagac      6120 cagagcctgg accaccctgg aaagaaacgg ccagctgtat gtgtggaacg accccaggg      6180 caacccccca cctgaggatg tgaccatccc tgagatcgcc ggctacggca ccgacgagtg      6240
gacagactgg tcctggaaaa gcctgcggat caagggcagc cactgccgcg agatcgtgga      6300
caacgtggtg gatatggccc acttcttcta catccactac agcttccccc ggtacttcaa      6360
```

```
gaacgtgttc gagggccaca ccgccaccca gtacatgcac tctaccggca gagaagatgt   6420
gatcagcggc accaactacg acgacccaa cgccgagctg agaagcgagg ccacctactt   6480
cggccccagc tacatgatcg actggctgga aagcgacgcc aacggccaga ccatcgagac   6540
aatcctgatc aactgccact accccgtgtc caacaacgcg ttcgtgctgc agtacggcgc   6600
catcgtgaag aaactgcccg gcgtgtccga cgagatcgct gccggaatgg ccgagcagtt   6660
tgccgaaggc gtgcagctgg gcttcgagca ggacgtggaa atctggaaga acaaggcccc   6720
catcgacaac cccctgctga gcgaagagga cggccctgtg tatcagctgc ggcggtggta   6780
tcagcagttc tacgtggacg tggaagatat caccgaggac atgaccaagc gcttcgagtt   6840
cgagatcgat accaccagag ccgtggcctc ttggcagaaa gaggtggccg agaacctggc   6900
caagcaggcc gaaggctcta cagccacacc tggcagcggc gccaccaact tcagcctgct   6960
gaaacaggcc ggggatgtgg aagagaaccc aggccctatg ccccttact ctctgctcgt   7020 gacacggctg cagaaagctc tgggagtgcg ccagtatcac gtggcaagcg tgctgtgtca   7080
gcgcgctaaa gtggctatga gcggctaccc ctacgatgtg cctgattatg ctggcggcgg   7140
aggctccatg acagccgtgc aggctcctgt gaccagcaga gccacagtgc tgaccgtgtc   7200
tgccgtggtg caggaaacag ccgatgccgt gtccctggtg ttcgacgtgc ccgacgacag   7260
aagagaggac ttcacctaca gacccggcca gttcctgacc ctgagaatcc ccagcgacag   7320
gacaggcagc gtggccagat gttacagcct ggccagcagc cctttcaccg cgagcctcc   7380 aaaagtgacc gtgaagagaa cagctggcgg ctacggcagc aactggctgt gcgacaatat   7440
cgtggccgga cggtccatcg aggtgctgcc tccagctggc gtgttcaccc ctgccgatct   7500
gaccgagaaa ctggtgctgt tgctggcgg aagcggcatc accccgtga tgagcatcct   7560 ggaatccgcc ctgcacagcg gcaacaggga cgtggtgctg atctacggca accgcgacga   7620
gaagtccgtg atcttcgccg agaagctgag agagctggcc gccagacacg ctggcgctct   7680
gacagtggtg cattggctgg aatcagtgca gggcctgccc agccctcagc agctggccac   7740
actgatcagc cccttcgccg accacagggc ctacatgtgt ggcccaggcc ccttcatgga   7800
caccgtgcgg aaggactgc tgctggctgg cgtgcccaag acagaatcc acgccgaggt   7860 gttcaccagc ctgagcggcg atcctttcgc cgatgtgccc ctggtggaaa tcgacgagtc   7920
cgacgccgat gccacctctg ccacagtgca gctggatggc gaggaacacg acctcgtgtg   7980
gcctagaagc gccacactgg tggacgtgat gctgtccaag ggcctggacg tgccctacag   8040
ctgcagagaa ggcgagtgcg gcagctgcgc ctgtactgtg gtggaaggcg acgtggacag   8100
cctgcctagc gccatcctgg acgaagagga tatcgccaat ggctacgtgc tggcctgcca   8160
ggctagaccc aagagcgatc acgtgcggat cgagttcggc agcggcgagg aagaggcag   8220 cctgctgaca tgcggagatg tggaagagaa ccctggcccc gactacaagg acgacgacga   8280
taagatgcag gactggacta gtgaatgcga cgtgctggtc gtgggctctg gcggaggcgc   8340
tctgacaggc gcttatacag ctgccgccca gggcctgacc accatcgtgc tggaaaagac   8400
cgacagattc ggcggcacca cgcctactc tggcgcctct atttggctgc ctggcaccca   8460
ggtgcaggaa agagccggac tgcctgacag caccgagaac gccagaacct acctgagagc   8520
cctgctgggc gacgccgaga gcaaagaca ggacgcctac gtggaaaccg cccctgctgt   8580
ggtggctctg ctggaacaga accccaacat cgagttcgag ttccgggcct tccccgacta   8640
ctacaaggcc gagggcagaa tggacaccgg ccgcagcatc aacccctgg atctggaccc   8700
```

```
tgccgacatc ggcgatctgg ccggaaaagt gcggcccgag ctggaccagg atagaaccgg      8760
acaggatcac gccctggcc ccatgattgg aggcagagcc ctgatcggca gactgctggc       8820
tgctgtgcag agcaccggaa aggccgagct gagaaccgag agcgtgctga ccagcctgat      8880
cgtggaagat ggcagagtcg tgggcgccga ggtggaatct gggggcgaga cacagcggat     8940
caaggccaac agaggcgtgc tgatggccgc tggcggcatc gagggaaacg ccgagatgag      9000
ggaacaggcc ggaacacccg gcaaggccat ctggtctatg gccccttcg gagccaatac      9060 cggcgacgcc atctctgccg gaattgccgt gggcggagct accgcactgc tggatcaggc      9120
ctggttctgc cctggcgtgg aacagcctga tggcagcgcc gcctttatgg tgggagtgcg      9180
gggaggactg gtggtggatt ctgccgggga gagatacctg aacgagagcc tgccctacga      9240
ccagttcggc agagctatgg acgcccacga tgacaacggc tccgccgtgc ccagcttcat      9300
gatcttcgac agcagagagg gcggaggcct gcccgccatc tgcatcccta ataccgcccc      9360
agccaagcac ctggaagccg gaacatgggt gggagccgac acactggaag aactggccgc      9420
caagacaggc ctgcctgccg atgctctgag aagcaccgtg gaaaagttca cgacgccgc      9480 caagctgggc gtggacgaag agttccatag aggcgaggac ccctacgacg ccttcttctg      9540
cccacctaat ggcggagcca acgccgccct gaccgccatt gagaacggcc cttttacgc      9600 cgccagaatc gtgctgagcg acctgggcac aaagggcggc ctcgtgaccg atgtgaacgg      9660
cagagtgctg agagccgacg gcagcgccat tgacggactg tatgccgccg gaaataccag      9720
cgccagcctg agcggcagat tctaccctgg cccaggcgtg ccactgggca ccgctatggt      9780
gttcagctac agagctgccc aggacatggc gaagtaattc tagagagctc aaggtgaatt      9840
ggctagcgac ccagctttct tgtacaaagt tggcattata agaaagcatt gcttatcaat      9900
ttgttgcaac gaacaggtca ctatcagtca aaataaaatc attatttgcc atccagctga      9960
tatcccctat agtgagtcgt attacatggt catagctgtt tcctggcagc tctggcccgt     10020
gtctcaaaat ctctgatgtt acattgcaca agataaaaat atatcatcat gaacaataaa     10080
actgtctgct tacataaaca gtaatacaag gggtgttatg agccatattc aacgggaaac     10140
gtcgaggccg cgattaaatt ccaacatgga tgctgattta tatgggtata atgggctcg      10200 cgataatgtc gggcaatcag gtgcgacaat ctatcgcttg tatgggaagc ccgatgcgcc     10260
agagttgttt ctgaaacatg gcaaaggtag cgttgccaat gatgttacag atgagatggt     10320
cagactaaac tggctgacgg aatttatgcc tcttccgacc atcaagcatt ttatccgtac     10380
tcctgatgat gcatggttac tcaccactgc gatccccgga aaaacagcat tccaggtatt     10440
agaagaatat cctgattcag gtgaaaatat tgttgatgcg ctggcagtgt tcctgcgccg     10500
gttgcattcg attcctgttt gtaattgtcc ttttaacagc gatcgcgtat ttcgtctcgc     10560
tcaggcgcaa tcacgaatga taacggtttt ggttgatgcg agtgattttg atgacgagcg     10620
taatggctgg cctgttgaac aagtctggaa agaaatgcat aaacttttgc cattctcacc     10680
ggattcagtc gtcactcatg gtgatttctc acttgataac cttattttg acgaggggaa      10740 attaataggt tgtattgatg ttggacgagt cggaatcgca gaccgatacc aggatcttgc      10800
catcctatgg aactgcctcg gtgagttttc tccttcatta cagaaacggc ttttcaaaa      10860 atatggtatt gataatcctg atatgaataa attgcagttt catttgatgc tcgatgagtt      10920
tttctaatca gaattggtta attggttgta acactggcag agcattacgc tgacttgacg      10980
ggacggcgca agctcatgac caaaatccct taacgtgagt tacgcgtcgt tccactgagc      11040
gtcagacccc gtagaaaaga tcaaaggatc ttcttgagat ccttttttc tgcgcgtaat      11100
```

```
ctgctgcttg caaacaaaaa aaccaccgct accagcggtg gtttgtttgc cggatcaaga    11160
gctaccaact cttttccga aggtaactgg cttcagcaga gcgcagatac caaatactgt    11220
tcttctagtg tagccgtagt taggccacca cttcaagaac tctgtagcac cgcctacata    11280
cctcgctctg ctaatcctgt taccagtggc tgctgccagt ggcgataagt cgtgtcttac    11340
cgggttggac tcaagacgat agttaccgga taaggcgcag cggtcgggct gaacgggggg    11400
ttcgtgcaca cagc                                                     11414
```